United States Patent [19]
Kitajima

[11] Patent Number: 6,057,916
[45] Date of Patent: *May 2, 2000

[54] AUTOMATIC INCLINATION CORRECTOR AND INCLINATION SENSOR USING AN AUTOMATIC INCLINATION CORRECTOR

[75] Inventor: Eiichi Kitajima, Yokohama, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,795

[22] Filed: Dec. 30, 1996

[30] Foreign Application Priority Data

Dec. 29, 1995 [JP] Japan .................................. 7-353057
Oct. 1, 1996 [JP] Japan .................................. 8-280231

[51] Int. Cl.[7] .............................. G01C 1/06; G01C 9/06
[52] U.S. Cl. ...................... 356/139.1; 356/148; 33/366; 33/377
[58] Field of Search ............................. 366/139.1, 371, 366/148; 33/366, 377

[56] References Cited

U.S. PATENT DOCUMENTS 3,741,656  6/1973  Shapiro ..................................... 73/293
5,392,112  2/1995  Nakamura ............................ 356/139.1

FOREIGN PATENT DOCUMENTS 0 626 561 A1  11/1994  European Pat. Off. .
0 676 618 A1  10/1995  European Pat. Off. .
797 071       9/1997   European Pat. Off. .
6-147890      5/1994   Japan .
6-147891      5/1994   Japan .

OTHER PUBLICATIONS

Patent Abstracts of Japan, Pub. No. 06147893A, May 27, 1994.
Patent Abstracts of Japan, Pub. No. 08035835 A published Feb. 1996.
Patent Abstracts of Japan, Pub. No. 08075466 A published Mar. 1996.

*Primary Examiner*—Mark Hellner
*Attorney, Agent, or Firm*—Pillsbury Madison & LLP

[57] ABSTRACT

An automatic inclination corrector and an inclination sensor using the automatic inclination corrector free from the temperature, for optical instruments. A transparent container 3 seals silicon oil C having a free liquid surface C1. A collimation lens 2 guides the laser beam from the diode 1 to the free liquid surface C1. The inclination corrector corrects the tilt of the instrument to glide the laser beam L4 from the container 3 to advance the beam upward with a normal angle. A reflecting mirror 5 reflects beam L2 after total reflection at the free liquid surface C1. The beam is inverted by a roof prism 6 and passes through silicon oil C and the free liquid surface C1 once. This removes the refractive index n influence to the laser beam L4, and gives an angular change to the laser beam 4 to head the laser beam L4 to a fixed direction.

17 Claims, 10 Drawing Sheets

AUTOMATIC INCLINATION CORRECTOR AND INCLINATION SENSOR USING AN AUTOMATIC INCLINATION CORRECTOR

BACKGROUND OF THE INVENTION

1. Field of the invention

This invention relates to an automatic inclination corrector and an inclination sensor using the automatic inclination corrector. More particularly, this invention relates to an automatic corrector suitable to be used in a laser beam emission type measuring apparatus for construction, and an inclination sensor using such corrector.

2. Related Art

FIG. 9 shows an example of prior art automatic inclination corrector, which is disclosed in Japanese Patent Application Laid-open H6-147891. The automatic inclination corrector comprises a laser diode 101, a transparent container 102 in which silicon oil C having a free liquid surface C1 is sealed, a collimation lens 103 for guiding the laser light L emitted from the laser diode 101 to the free liquid surface C1, a reflecting mirror 104, an anamorphic prism 105 positioned between the container 102 and the reflecting mirror 104, and a beam expander 106.

The laser diode 101 emits laser beam L upward with an angle of 45 degrees relative to a horizontal line. The anamorphic prism 105 makes the reflective sensitivities of the X-axis component equal to the Y-axis component of the laser light, which was reflected by the free liquid surface C1. The X-axis and Y-axis define a horizontal plane. The X-axis is parallel to the view of FIG. 9, whereas the Y-axis is normal to the plane of FIG. 9. The beam expander 106 changes the angle of the laser beam reflected from the reflecting mirror 104. The automatic inclination corrector is generally fixed inside a measuring instrument (e.g., laser beam emission type measuring machine).

The operation of the prior art corrector is described below. If the corrector is slanted by an angle, $\theta 1$, the free liquid surface C1 of silicon oil C inclines by that angle relative to the transparent container 102 because the free liquid surface C1 tends to maintain a horizontal upper surface. In this situation, laser beam L emitted from the laser diode 101 passes through the collimation lens 103 and strikes the free liquid surface C1 with an incident angle of 45 degrees. The laser beam L1 is totally reflected from the free liquid surface C1 and exits from the transparent container 102 as a laser beam L2.

The laser beam L2 enters the anamorphic prism 105. The anamorphic prism 105 has an angular-change magnification m (m=1/1.4142) which is effective only to changing the reflection-angle $\theta 02x$ ($\theta 2x=2n\theta 1$) of the light component in the X-axis direction. The anamorphic prism 105 makes the reflection-angular change $\theta 2x$ equal to the change of the reflection-angle $\theta 2y$ ($\theta 2y=1.4142n\theta 1$) of the light component in the Y-axis direction. In other words, the laser beam L2 becomes a uniform laser beam with an equal reflection-angle change $\theta 3$ (=1.4142n$\theta 1$) (i.e., with an equal reflection sensitivity) in all directions by passing through the anamorphic prism 105. The laser beam L2 impinges upon the mirror 104 in this state.

The reflection-angle change $\theta 3$ of the laser beam L2, reflected from the mirror 104, is canceled by the beam expander 106. As a result, the laser beam L3 which exits from the beam expander 106 advances in the vertical direction, thereby automatically correcting the tilt of the instrument ($\theta 1$). The beam expander 106 is composed of two bi-convex lenses 106A and 106B. The relationship between the focal distances f2 and f3 of the bi-convex lenses 106A and 106B is f2:f3=1:1.4142n. Therefore, the inclination angle $\theta 4$ of the laser beam L3 is represented as follows:

$$\theta 4=1.4142n\theta 1 * f2/f3=\theta 1 \tag{1}$$

Furthermore, the exit direction of the laser beam L3 is also inverted because the changing direction of inclination angle $\theta 4$ is opposite to the slanting direction of the angle $\theta 1$. Thus, the inclination of angle $\theta 1$ is corrected. By projecting the laser beam L3, in which the inclination was corrected, so that it becomes parallel to the horizontal plane, measurement and construction on horizontal plane can be performed.

FIG. 10 shows an example of prior art inclination sensor, which is disclosed in Japanese Patent Application Laid-open H6-147893. The inclination sensor of this figure is obtained by removing the reflecting mirror 104 and beam expander 106 from the automatic inclination corrector of FIG. 9, and by adding quadrant light-receiving elements 107A–107D for receiving laser beam L2 from the anamorphic prism 105. The laser beam L2 has a uniform reflection-angle change $\theta 3$ ($\theta 3$=1.4142n 1) in all directions after passing through the anamorphic prism 105. This uniform laser beam L2 enters the light-receiving elements 107A–107D.

Based on the output difference between the light-receiving elements 107A and 107C, the inclination angle in Y-direction is calculated. Based on the output difference between the light-receiving elements 107B and 107D, the inclination angle in X-direction is calculated. The calculation results (the respective inclination angles in X and Y directions) are displayed on a display.

However, in prior art automatic inclination correctors, when the refractive index n of the silicon oil C changes in response to a change in the temperature, the value of 1.4142n$\theta 1$ in the equation (1) also varies, although the value f2/f3 is fixed without change. As a result, the inclination angle $\theta 4$ of the laser beam L3 exiting from the expander 106 changes, and the accuracy in the correction of inclination drops.

Similarly, in prior art inclination sensors, when the refractive index n of the silicon oil C changes in response to temperature changes, the inclination angle $\theta 3$ ($\theta 3$=1.4142n$\theta 1$) of laser beam L3 changes due to the change in the refractive index n of the silicon oil C, caused by the temperature change. The location where the laser beam L2 enters the light-receiving element 107A–107D also changes as the temperature changes. This also decreases the accuracy of inclination detection.

SUMMARY OF THE INVENTION

This invention was conceived to overcome the above problems in the prior art, and aims to provide an automatic inclination corrector and an inclination sensor which maintains accuracy in inclination correction and detection without being affected by temperature changes.

An automatic inclination corrector is provided which automatically corrects inclination of an instrument so that the emitted light beam always heads in a fixed direction. The automatic inclination corrector comprises a light source for emitting a light beam, a container for storing transparent liquid having a free liquid surface, and a light projection system for guiding the light beam to the free liquid surface with an incident angle that allows total reflection of the light beam at the free liquid surface. The automatic inclination corrector is further equipped with an optical system for inverting the light beam which passes through the liquid and exits from the container after total reflection at the free liquid surface.

The light beam which exits from the container after total reflection at the free liquid surface is inverted by an optical system. The inverted light beam passes through the transparent container and the free liquid surface. The refraction angle of the laser beam which exits to the external air layer after total reflection is canceled by the angle of refraction of the inverted light beam which passes through the transparent liquid and the free liquid surface. Even if the refractive index of the transparent liquid varies due to temperature changes, inclination is accurately corrected without being affected by a corresponding change in the refractive index.

The automatic inclination corrector may comprise a reflection sensitivity corrector for making the light components in two orthogonal axis directions of the light beam subject to total reflection at the free liquid surface equal to each other.

The light components of the two axes with equalized reflection sensitivity are inverted by the optical system and pass through the clear liquid and free liquid surface. Thus, the two components of the light emitted from the automatic inclination corrector are corrected to be emitted towards the fixed direction.

In the automatic inclination corrector, the glancing angle can be 60 degrees. The automatic inclination corrector reflects the light emitted from the container to pass the inverted light through the liquid and the free liquid surface.

By passing through the clear liquid and free liquid surface once, the inverted light from the automatic inclination corrector can avoid any influence from the refractive index of the clear liquid, and the angle is adjusted to direct the emitted light in a fixed direction. Thus, when the light from the optical system enters the free liquid surface at an angle of 60 degrees, the inclination adjustment is carried out without influence, even if the refractive index of the liquid changes due to temperature changes. Thus, an optical member to adjust the emitted light to be in a fixed direction is unnecessary.

The glancing angle may be 45 degrees. The automatic inclination corrector reflects the light from the container to pass through the clear liquid and the free liquid surface twice. The automatic inclination corrector may further comprise an angle adjuster which adjusts the angle of the light passing through the container to be directed in a vertical or horizontal direction.

By passing the inverted light through the clear liquid and free liquid surface twice, the influence of the refractive index on the light which is emitted from the automatic inclination corrector from the clear liquid is avoided. The angle adjuster adjusts the angle of the light from the automatic inclination corrector by passing through the container twice to be directed in a vertical or horizontal direction at all times. Thus, when the light comes through the free liquid surface at a 45 degree angle, the angle is adjusted without influence from the clear liquid, even when the refractive index of the clear liquid is changed by a change in temperature.

In another aspect of the invention, the inclination sensor comprises a light-receiver for receiving the light beam which passes through the liquid and the free liquid surface and exits from the container.

A light beam which is totally reflected on the free liquid surface passes through the container. The light passes through the clear liquid and the free liquid surface and totally reflects on the free liquid surface. A refraction angle of the light which comes out to the air layer cancels the refraction angle of the light passing through the clear liquid and the free liquid surface. Thus, even when the refractive index is altered by changes in the temperature, the inclination detection is not influenced.

The glancing angle can be 60 degrees. The automatic inclination corrector reflects the light from the container to pass through the clear liquid and the free liquid surface twice. The automated inclination corrector has a first light receiver which receives the light passing once through the clear liquid and the free liquid surface. The automated inclination corrector also comprises a second light receiver which receives the light passing twice through the clear liquid and the free liquid surface.

Among the light reflected totally on the free liquid surface and being divided out through the container, the light passing once through the clear liquid and the free liquid surface is received by the first light receiver, while the light passing twice through the clear liquid and the free liquid surface is received by the second light receiver. Thus, the light components of two axes with different refractive indexes are received at a first or second light receiver. Thus, the present invention makes unnecessary an optical system to make the refractive indexes of the light components of the two axes even.

In still another aspect of the invention, an automatic inclination corrector corrects an inclination of an instrument so that the light beam emitted from the corrector is always directed in a fixed direction. The automatic inclination corrector comprises a light source and a container for storing transparent liquid having a free liquid surface. A light projection system guides the light beam emitted from the light source so that the light beam passes through the liquid and the free liquid surface. An optical system inverts the light beam which exits through the free liquid surface and the container, while reflecting the inverted light beam toward the free liquid surface so that the inverted light is totally reflected by the free liquid surface.

In still another aspect of the invention, an inclination sensor uses the above automatic inclination corrector. The inclination sensor comprises a light-receiver for receiving the light beam which exits from the container after total reflection at the free liquid surface.

The light passed through the free liquid surface is reflected in two opposite axes directions and totally reflected on the free liquid surface again. Therefore, the refraction angle of the light passing through the free liquid surface and the refraction angle of the light coming through the air layer outside of the container are canceled. Thus, changes in temperature do not influence the accuracy of the automatic inclination corrector and detector.

BRIEF DESCRIPTION OF THE DRAWINGS

The preferred embodiments will now be described with reference to the drawings, in which.

DETAILED DESCRIPTION OF THE PRESENTLY PREFERRED EXEMPLARY EMBODIMENTS

Figure 1:
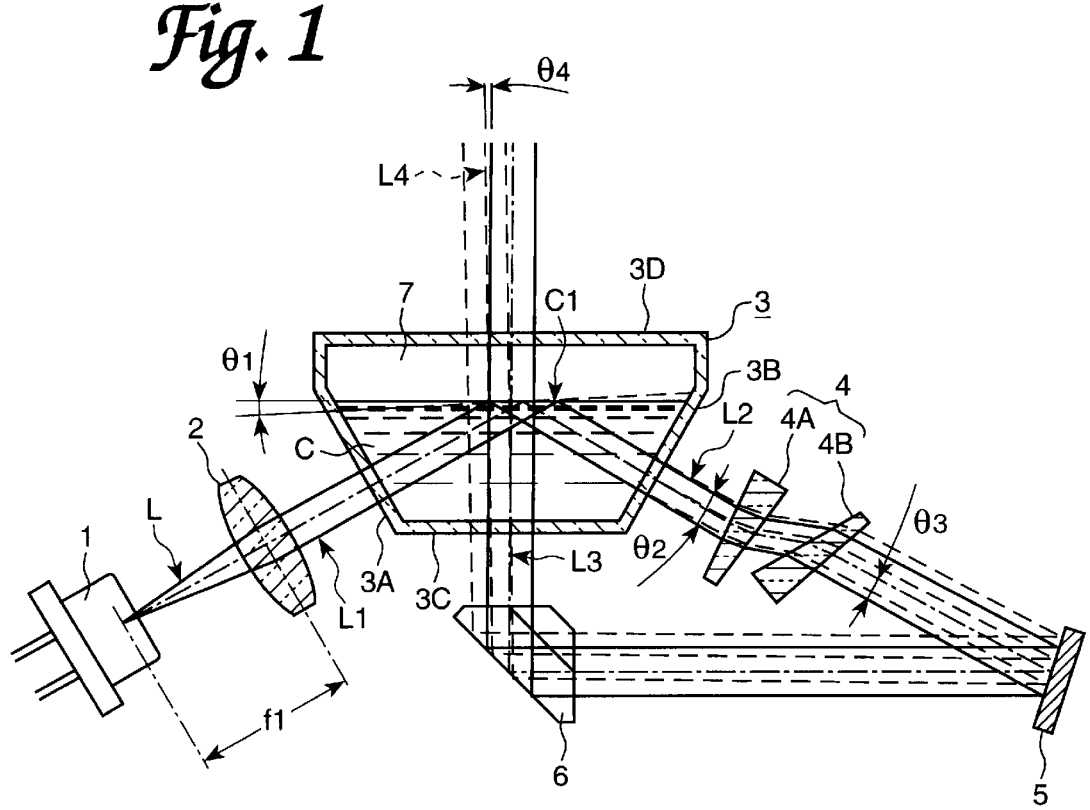
FIG. 1 shows the overall structure of the automatic inclination corrector according to the first embodiment of the invention.

The preferred embodiments of the invention will be described with reference to the attached drawings. The same elements throughout the various embodiments have the same reference numerals.

(First Embodiment)

FIG. 1 shows the automatic inclination corrector according to the first embodiment of the invention. The automatic inclination corrector is built in various optical instruments (e.g., a laser beam emitting type measuring machine, or an optical leveler). The automatic inclination corrector comprises a laser diode 1, transparent container 3 for storing silicon oil C having a free liquid surface C1, a collimation lens (light projection system) 2 for guiding the laser beam L from the laser diode 1 to the free liquid surface C1, an anamorphic prism 4, a reflecting mirror 5, and a roof prism 6.

Laser diode 1 is arranged so that the laser beam L is emitted upward at an angle of 60 degrees relative to the horizontal line. Collimation lens 2 is positioned so that the focal point f1 of collimation lens 2 coincides with the position of the light source (laser diode 1). Laser beam L1 existing from the collimation lens 2 becomes collinated, and enters the free liquid surface C1 with an incident angle of 60 degrees.

Transparent container 3 is made of, for example, glass. The transparent container 3 is sealed up and has an entry wall 3A arranged perpendicular to the laser beam L1, an exit wall 3B arranged perpendicular to the laser beam L2 which corresponds to the laser beam L1 which is totally reflected by the free liquid surface C1, a bottom wall 3C, and a top wall 3D parallel to the bottom wall 3C. Silicon oil C is stored in the transparent container 3 so that space 7 is formed between the silicon oil surface and the top wall 3D of the sealed container 3.

An anamorphic prism 4 is positioned in the light path of the laser beam L2 which exits from the transparent container 3 after total reflection at the free liquid surface C1. The anamorphic prism 4 is composed of wedge prisms 4A and 4B. The anamorphic prism 4 is used to make the reflection sensitivities of two orthogonal light components (in X and Y axis directions) of the laser beam L2 after total reflection at the free liquid surface C1 equal to each other. The X-axis and Y-axis are perpendicular to each other and define a horizontal plane.

The anamorphic prism 4 is designed to change the reflection sensitivity of only the X-axis component of the laser beam L2 (i.e., change $\theta 2x$ in angle of reflection of X-axis component, which corresponds to the change $\theta 1$ in incident angle of laser beam L1 entering the free liquid surface C1) to ½. On the other hand, the reflection sensitivity of the Y-axis component (i.e., the change $\theta 2y$ in the angle of reflection of the Y-axis component, which corresponds to the change $\theta 1$ in incident angle) is not affected by the anamorphic prism 4.

Reflecting mirror 5 reflects the laser beam L2, which exits from the transparent container 3 after total reflection at the free liquid surface C1 and passes through the anamorphic prism 4, in horizontal direction toward the roof prism 6.

The roof prism 6 inverts the X and Y-axis components of the laser beam L2 reflected from the reflected mirror 5, while reflecting the laser beam L2 vertically upward so that the inverted laser beam L3 enters the bottom wall 3C of the transparent container 3 at a substantially normal angle.

The reflecting mirror 5 and the roof prism 6 make up an optical system for inverting the laser beam L2, which exits from the transparent container 3 after total reflection at the free liquid surface C1, so that the inverted laser beam L3 passes once through the silicon oil C and the free liquid surface C1.

The operation of the automatic inclination corrector of the first embodiment will be described below. If the entire corrector is slanted by an angle $\theta 1$, an inclination angle $\theta 1$ is generated relative to the free liquid surface C1 of silicon oil C sealed within the transparent container 3 because the free liquid surface C1 tends to be maintained at a horizontal. In FIG. 1, for the purpose of simplifying the explanation and drawing, the inclination of angle $\theta 1$ is indicated by the broken line such that the free liquid surface C1 inclines relative to the transparent container 3 from the horizontal state to the position of the broken line.

The laser beam L emitted from the laser diode 1 is collimated by the collimation lens 2 and becomes a parallel light beam L1. The laser beam L1 passes through the entry wall 3A of the transparent container 3 and silicon oil C, and enters the free liquid surface C1. The incident angle of laser beam L1 is changed by $\theta 1$ from the original incident angle 60 degree which is an incident angle in the non-slanting state. In the normal state without inclination, the laser beam L1 enters the free liquid surface C1 at an incident angle of 60 degrees. When the corrector is slanted in the direction of FIG. 1, the incident angle becomes 60+$\theta 1$ degrees. If the corrector is slanted in the opposite direction, the incident angle becomes 60−$\theta 1$ degrees. The incident laser beam L1 is totally reflected by the free liquid surface C1. Among the total reflection laser beam from the free liquid surface C1, the change $\theta 2x$ in the reflection angle of the X-axis light component is represented as:

$$\theta 2x = 2n\theta 1$$

("n" is a refractive index of silicon oil C).

The change $\theta 2y$ in reflection angle of the Y-axis light component is represented as:

$$\theta 2y = n\theta 1$$

The laser beam L2 having X and Y-axis light components, with different reflection sensitivities, passes through silicon oil C and exits through wall 3B. The laser beam L2 exits from the transparent container 3 and enters anamorphic prism 4. Only the reflection sensitivity of the X-axis component of the laser beam L2 is reduced to ½ by the anamorphic prism 4. Consequently, the reflection-angular change $\theta 2x$ (=$2n\theta 1$) of the X-axis light component becomes $n\theta 1$, which is equal to the reflection-angular change $\theta 2y$ (=$n\theta 1$) of the Y-axis light component.

Thus, the laser beam L2, having passed through the transparent container 3, is made uniform by the anamorphic prism 4 so that the reflection sensitivities become equal in all directions, and strikes the reflecting mirror 5 with an angle $\theta 3=n\theta 1$. The laser beam L2 reflected by the reflecting mirror 5 advances in the horizontal direction and enters the roof prism 6. Both X and Y-axis light components of the laser beam L2 are inverted by the roof prism 6, while being reflected upward.

Figure 2A:
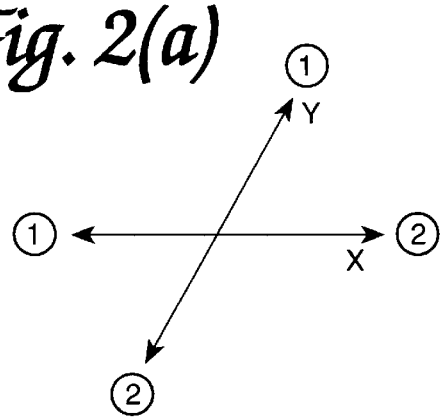
FIGS. 2(a) to 2(c) show reflections of the light components in X and Y axis directions at the respective reflective unit.
Figure 2B:
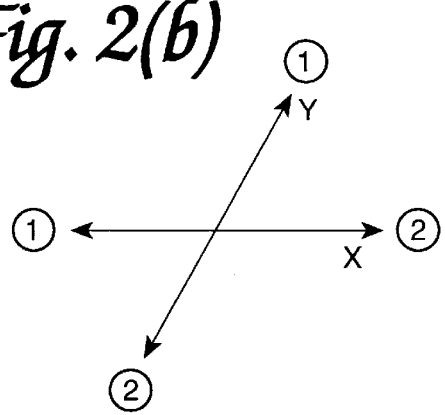
Figure 2C:
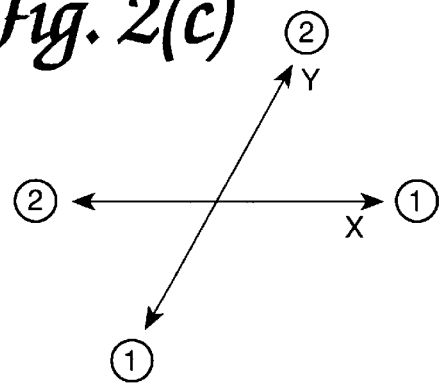

Definition of the term "inversion" will be explained. FIGS. 2(*a*)–2(*c*) show how the X and Y-axis light components change through the reflection at the respective reflecting media, where FIG. 2(*a*) shows the reflection at the free liquid surface C1, FIG. 2(*b*) shows the reflection at the reflecting mirror 5, and FIG. 2(*c*) shows the reflection at the roof prism 6, Numeral (1) denotes the left side of the respective light components, and numeral (2) denotes the right side of the light components. In FIGS. 2(*a*) and 2(*b*) (reflections at the free liquid surface C1 and the reflecting mirror 5, respectively), the directions of X-axis component and Y-axis component (right and left) are not inverted by reflection. On the contrary, with a roof prism 6, the right-left directions of both X and Y-axis light components are inverted. In the specification, inversion of light component is defined as an inversion of the right and left sides of X-axis component and Y-axis component.

Both X and Y-axis components of the laser beam L2, reflected by the reflecting mirror 5, are inverted by the roof prism 6, while being reflected by the roof prism 6 to be a laser beam L3. The inverted laser beam L3 enters the bottom wall 3C of the transparent container 3 and passes through silicon oil C and free liquid surface C1 once from bottom to top.

Since both the X and Y-axis components of the laser beam L3 were inverted, the laser beam L3 is refracted by the silicon oil C having a free liquid surface C1 slanting by θ1 relative to the transparent container 3, in the opposite direction to the angular change of the laser beam L3 i.e., in a direction opposite to the change in the incident angle θ1 of the laser beam L1 at the time of entering the free liquid surface C1. In other words, by passing through the silicon oil C and the free liquid surface C1 once, the laser beam L3 becomes a laser beam L4 with an angular change of θ4 expressed by the expression (2), and exits from the container 3 through the top wall 3D upward.

$$\theta 4 = n\theta 1 - (n-1)\theta 1 \qquad (2)$$

From the expression (2), the following relationship is established.

$$\theta 4 = \theta 1 \qquad (2')$$

Furthermore, because the direction of the laser beam L4 has changed by θ4 in the opposite direction to the angle of slope θ1 of the inclination corrector, the laser beam L4 exits from the transparent container 3 through the top wall 3D upward in the vertical direction, thereby correcting (compensating) the inclination of the optical instrument in which the automatic inclination corrector is built in. The expression (2') does not contain the refractive index n of silicon oil C, unlike the expression (1) obtained from the prior art inclination corrector shown in FIG. 9. Therefore, the exit direction of the laser beam L4 is not affected by the change in the refractive index n due to a temperature change, and stable and accurate correction of inclination is achieved.

Thus, the feature of the first embodiment is to emit a laser beam L so that the beam L exits from the transparent container 3 as a laser beam L2 after the total reflection at the free liquid surface C1 and passes through the anamorphic prism 4; and to invert the laser beam L2 with a roof prism 6, while reflecting the laser beam L2 using the reflecting mirror 5 and the roof prism 6 so that he inverted laser beam L3 enters the transparent container 3 through the bottom wall 3C and passes through silicon oil C and the free liquid surface C1 once from bottom to top.

In this structure, the inverted laser beam L3 passes once through silicon oil C and the free liquid surface C1. As a result, the angle of refraction of the laser beam L2 (which was subject to total reflection at the free liquid surface C1) at the time of exiting from the transparent container 3 to the external air layer, is canceled by the angle of refraction of the inverted laser beam L3 at the time of passing through silicon oil C and the free liquid surface C1. This structure can remove the influence of the refractive index n of silicon oil C to the laser beam L4 exiting from the transparent container 3 (i.e., radiation beam from the automatic inclination corrector). In addition, the angle of laser beam L4 is changed so that the laser beam L4 is always directed in a fixed direction. In the embodiment, the laser beam L1 from the laser diode 1 enters the free liquid surface C1 at an incident angle of 60 degrees. Even if the refractive index n of silicon oil C changes because of a change in temperature, inclination correction is accomplished without being subjected to the influence of the change of the refractive index.

In addition to the effect of removing the influence of the refractive index n to the laser beam L4, angular change is given to the laser L4 when it passes through silicon oil C and the free liquid surface C1 so that the laser beam L4 is always emitted upward with a normal angle. In this structure, an optical component for giving an angular change to the laser beam L4 (e.g., beam expander 106 used in a prior art corrector shown in FIG. 9) is unnecessary. As a result, an automatic inclination corrector with a simpler structure is realized with low cost.

(Second Embodiment)

The automatic inclination corrector of the second embodiment will be described with reference to FIG. 3. In the automatic inclination corrector of the second embodiment, laser diode 1 is arranged so that the laser beam L is emitted upward at an angle of 45 degrees, and parallel, collinated light (laser beam L1) exits from the collimation lens 2 and enters the free liquid surface C1 at an incident angle of 45 degrees. The entry wall 3A of the transparent container 3 is perpendicular to the laser beam L1, and the exit wall 3B is perpendicular to the laser beam L2 which was totally reflected by the free liquid surface C1.

Galilean telescope 8 is positioned in the light path of the laser beam L2 which exits from the transparent container 3 after total reflection at the free liquid surface C1. The galilean telescope 8 is used to make the X and Y-axis components of the laser beam L2 equal, the laser beam L2 having exited through the transparent container 3 after total reflection at the free liquid surface C1. The galilean telescope is composed of a convex cylindrical lens 8A and a concave cylindrical lens 8B, each of which having a curvature in the Y-axis direction (perpendicular to the paper bearing FIG. 3).

The galilean telescope 8 is designed so that only the reflection sensitivity of the Y-axis component (i.e., change θ2y in the angle of reflection in Y-axis direction) is multiplied by 1.14142. The reflection sensitivity of the X-axis component (i.e., the change θ2x in the angle of reflection in X-axis direction)does not change with the galilean telescope 8.

Roof prism 6 is positioned vertically above the reflecting mirror 5. Laser beam L3, which exits through the transparent container 3 after total reflection and passing through the galilean telescope 8, is reflected by the reflecting mirror 5 vertically upward to the roof prism 6.

Roof prism 6 reflects the laser beam L3 in the horizontal direction. Half prism 9 is positioned in the light path of the laser beam L3. The half prism 9 is adhered to the top wall 3D of the transparent container 3. Laser beam L3 from the roof prism 6 is reflected by the half prism 9 vertically downward, and enters the top wall 3D of the transparent container 3. The laser beam L3 passes through free liquid surface C1 and silicon oil C and exits through the bottom wall 3C of the transparent container 3.

Under the transparent container 3, second reflecting mirror 11 is positioned to reflect back the laser beam L3 vertically upward so that the laser beam L3 enters the bottom wall 3C and passes through silicon oil C and the free liquid surface C1 again.

An optical system comprising, the reflecting mirror 5, the roof prism 6, the half prism 9 and the second mirror 11, invert the laser beam which exists from the transparent container 3 immediately after total reflection at the free liquid surface C1. The optical system is structured so that the inverted laser beam passes twice through silicon oil C and the free liquid surface C1. Right above the half prism 9, a beam expander 10 is positioned to give an angular change to the laser beam L4 passing through the half prism 9 so that the laser beam L4 is directed vertically upward.

The operation of the automatic inclination corrector will be described below. When the corrector is slanted by $\theta 1$, the free liquid surface C1 of silicon oil C inclines by $\theta 1$ relative to the transparent container 3, because the free liquid surface C1 tends to be maintained horizontal by gravitational forces.

Figure 3:
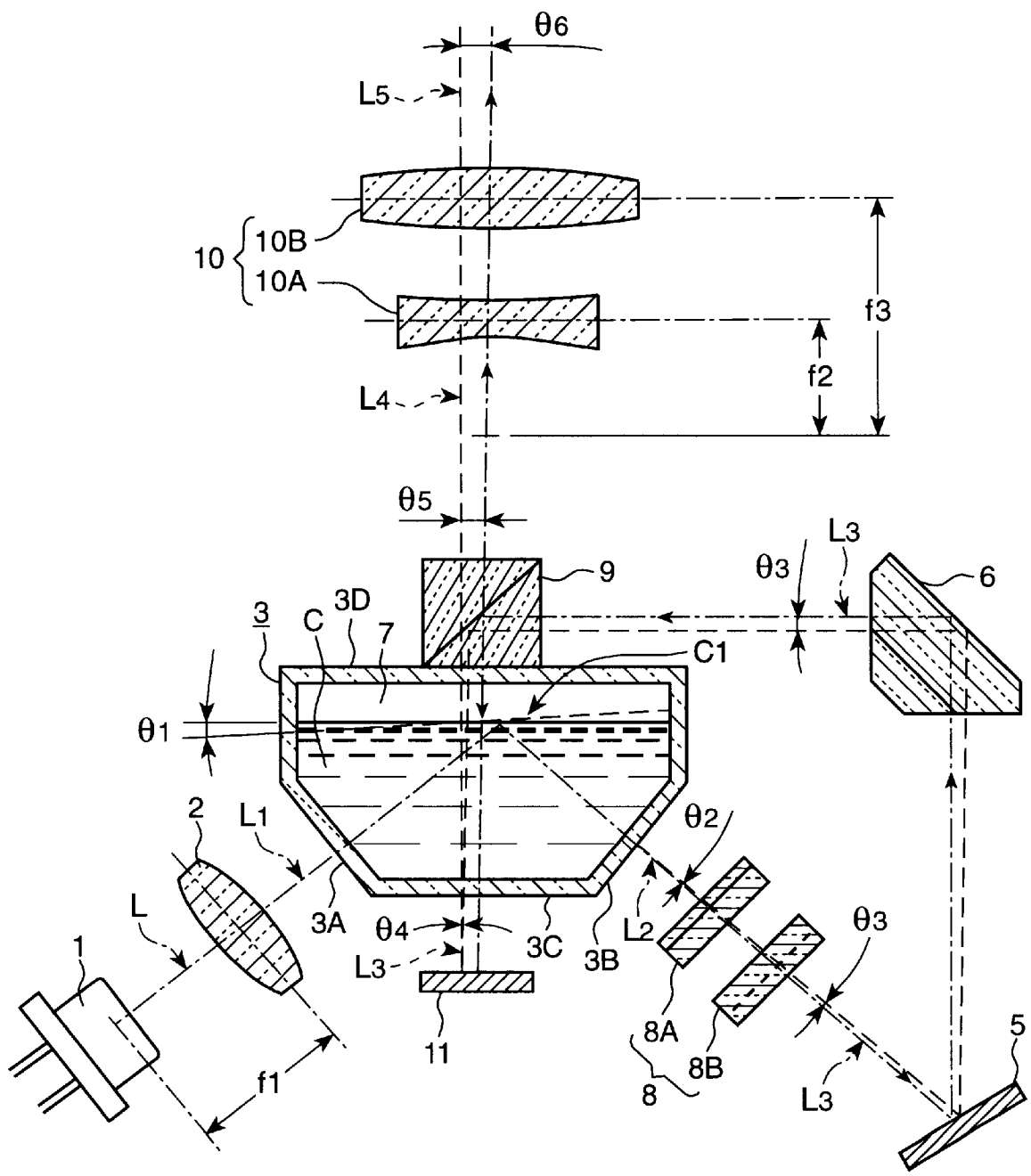
FIG. 3 shows the overall structure of the automatic inclination corrector according to the second embodiment.

Laser beam L1, which was made parallel by collimation lens 2, strikes the free liquid surface C1 with an incident angle of 45 degrees (45+$\theta 1$ when the corrector is slanted as shown in FIG. 3), and is totally reflected by the free liquid surface C1. Among the laser beam L2 totally reflected by the free liquid surface C1, a change $\theta 2x$ in the angle of reflection of the X-axis component is expressed as $\theta 2x = 2n\theta 1$, and a change $\theta 2y$ in the angle of reflection of the Y-axis component is expressed as $\theta 2y = 1.4142n\theta 1$.

Laser beam L2, having X and Y-axis light components with different reflection sensitivities, passes through silicon oil C, exits from transparent container 3 through the exit wall 3B, and enters galilean telescope 8. Only the Y-axis component of laser beam L2 is modified by the galilean telescope 8.and the reflection sensitivity of the Y-axis component becomes multiplied by 1.4142. Consequently, the reflection-angular change $\theta 2y$ (=1.4142n$\theta 1$) becomes $2n\theta 1$, which is the same as the change $\theta 2x$ (=$2n\theta 1$) in the angle of reflection of the X-axis component.

Thus, the laser beam L2, having exited through the transparent container 3, is made uniform by the galilean telescope 8 to have equal reflection sensitivities in all directions. The uniform laser beam L3 enters the reflecting mirror 5 with an angle $\theta 3 = 2n\theta 1$.

Laser beam L3 reflected by the reflecting mirror 5 advances vertically upward, and enters roof prism 6.

Both the X and Y-axis components of the laser beam L3 are inverted by the roof prism 6, while being reflected in the horizontal direction toward the half prism 9. The reflected laser beam L3 is further reflected by the half prism 9 vertically downward. The laser beam L3 enters the top wall 3D of the transparent wall 4 perpendicularly and passes through the free liquid surface C1 and silicon oil C from top to bottom.

Since both the X and Y-axis components of laser beam L3 are inverted, the laser beam L3 is refracted by silicon oil C, which has a free liquid surface C1 slanting by $\theta 1$ relative to the transparent container 3, in the opposite direction to the angular change in the laser beam L3. By passing through the free liquid surface C1 and silicon oil C, the laser beam L3 is changed in angle by $\theta 4$ as represented by the expression (3).

$$\theta 4 = 2n\theta 1 - (n-1)\theta 1 = (n+1)\theta 1 \quad (3)$$

In this state, the laser beam L3 exits from the transparent container 3 through the bottom wall 3C downward, and enters the second reflecting mirror 11.

The laser beam L3 reflected by the second reflecting mirror 11 takes a different light path from the entering path, enters the transparent container 3 through the bottom wall 3C, and passes through silicon oil C and the free liquid surface C1 from bottom to top. Similar to the first penetration, the laser beam L3 is refracted again by the free liquid surface C1 of silicon oil C in the opposite direction to the angular change of laser beam L3, because of the inverted X and Y-axis components of laser beam L3. By passing through silicon oil C and the free liquid surface C1, the angle of laser beam L3 becomes a laser beam L4 with an angular change of $\theta 5$ represented by the expression (4).

$$\theta 5 = (n+1)\theta 1 - (n-1)\theta 1 = 2\theta 1 \quad (4)$$

The laser beam L4 exits the transparent container 3 through the top wall 3D, passes through the half prism 9 upward, and enter the beam expander 10 at an angle of $\theta 5$ degrees.

A focal length f2 of entry side concave lens 10A of beam expander 10 is 15 mm, while the focal length f3 of the exit side convex lens 10B is 30 mm. Because of the relationship f2:f3=1:2, the angle of slant $\theta 6$ of laser beam L5 having exited from the exit side convex lens 10B of beam expander 10 is expressed as follows:

$$\theta 6 = 2\theta 1 * f2/f3 = \theta 1 \quad (5)$$

At the same time, the exit direction of the laser beam L5 is inverted (because the change in direction of the angle of slant $\theta 6$ is opposite to the slanting direction of the corrector by $\theta 1$), thereby correcting the inclination of angle $\theta 1$. The expression (5) does not contain the refractive index n of silicon oil C, unlike the expression (1) obtained from the prior art inclination corrector shown in FIG. 9. Therefore, even if the refractive index of silicon oil C varies due to a temperature change, accuracy of inclination correction is maintained without being affected by the change in the refractive index.

In the second embodiment, laser beam L3 having components inverted by the roof prism 6, passes twice through silicon oil C and the free liquid surface C1. This has a function of removing the influence of the refractive index n of silicon oil C to the laser beam L4 which exits from the transparent container 3 vertically upward (i.e., laser beam emitted from the corrector). Furthermore, the beam expander 10 gives an angular change to the laser beam L4 which passes twice through silicon oil C. This makes the laser beam L4 advance always vertically upward. Laser beam L1 emitted from the laser diode 1 enters free liquid surface C1 with an incident angle of 45 degrees. Even if the refractive index n changes due to a change in temperature, accurate inclination correction is performed without being subjected to such influence.

(Third Embodiment)

The automatic inclination corrector of the third embodiment will be described with reference to FIG. 4. This automatic inclination corrector is a modification of that of the second embodiment.

Similar to the second embodiment, parallel light (laser beam L1) having passed through collimation lens 2 enters free liquid surface C1 with an incident angle of 45 degrees. Laser beam L3 having passed through Galilean telescope 8 is inverted by the roof prism 6, while being reflected in the horizontal direction. Half prism 9 is positioned in the light path of laser beam L3 reflected from the roof prism 6. The laser beam L3 from the roof prism 6 is again reflected by the half prism 9 vertically upward, enters the transparent container 3 through the bottom wall 3C, and passes through silicon oil C and the free liquid surface C1 from bottom to top. The inner surface 3D of the top wall 3D of transparent container 3 is a reflecting mirror surface 3D'. Laser beam L4, having passed through silicon oil C and the free liquid surface C1 from bottom to top, is reflected by the reflecting mirror surface 3D'. The laser beam L4 passes through free liquid surface C1 and silicon oil C from top to bottom, exits from the transparent container 3 through the bottom wall 3C, and enters half prism 9.

Right under the half prism 9, beam expander (angle changer) 12 is positioned for giving an angular change to the laser beam L4 having passed through the half prism 9. The beam expander 12 is composed of two convex lenses 12A and 12B. With a roof prism 6, half prism 9 and a reflecting mirror surface 3D', an optical system is structured for inverting the laser beam L3, which exits from the transparent container 3 after total reflection at the free liquid surface C1, while reflecting the laser beam 3 so that the inverted laser beam passes through silicon oil C and the free liquid surface C1 twice.

The operation of the automatic inclination corrector will be described. When the corrector itself is slanted by an angle θ1, the free liquid surface C1 of silicon oil C slopes by θ1 relative to the transparent container 3 because the free liquid surface C1 tends to be maintained horizontal.

Figure 4:
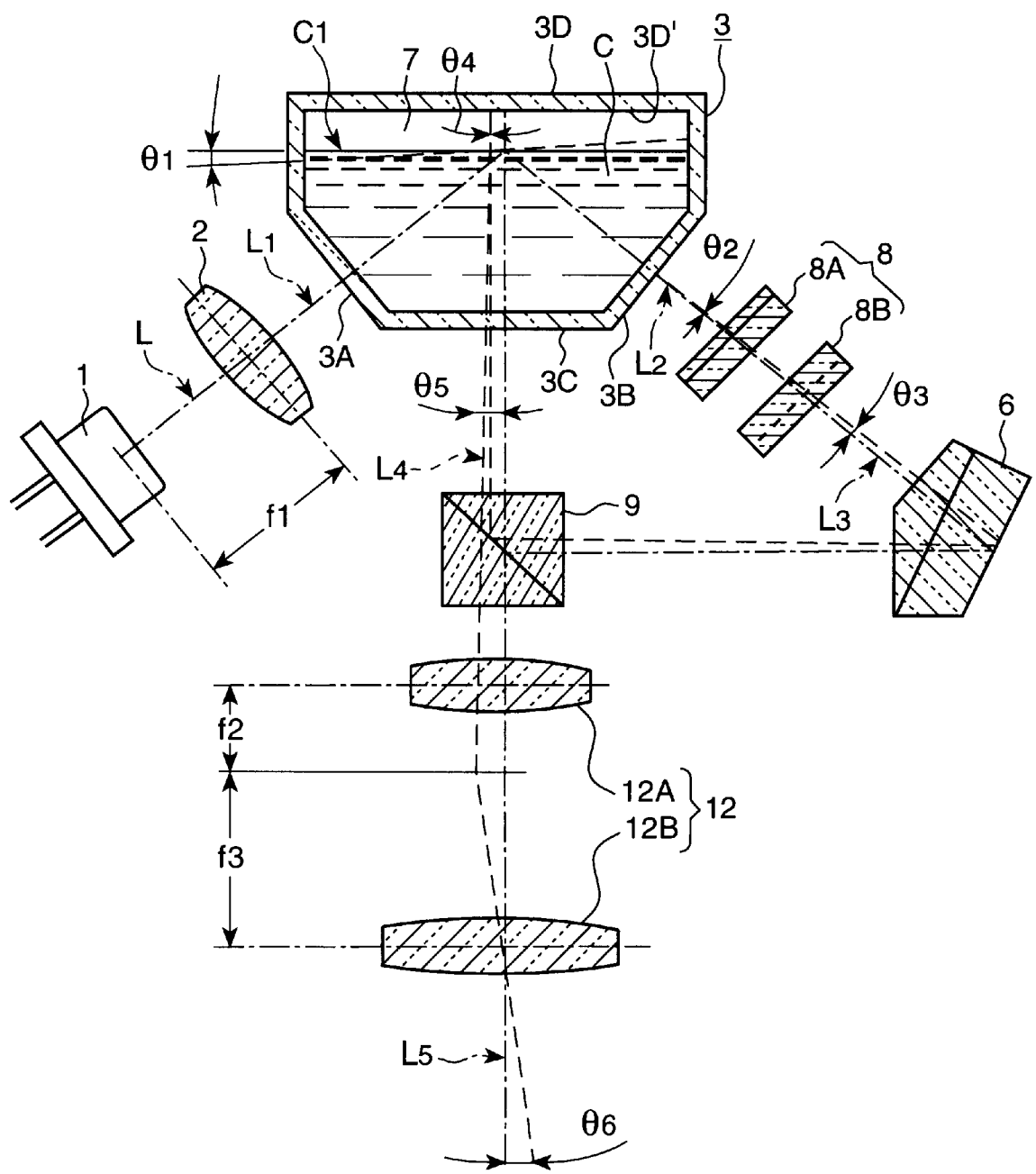
FIG. 4 shows the overall structure of the automatic inclination corrector according to the third embodiment.

Laser beam L1, which was made parallel by collimation lens 2, strikes the free liquid surface C1 at an incident angle of 45 degrees (45+θ1 when the corrector is slanted as shown in FIG. 4), and is totally reflected by the free liquid surface C1. Among the laser beam L2 totally reflected by the free liquid surface C1, a change θ2x in the angle of reflection of the X-axis component is expressed as θ2x=2nθ1, and a change θ2y in the angle of reflection of the Y-axis component is expressed as θ2y=1.4142nθ1.

Laser beam L2 having X and Y-axis light components with different reflection sensitivities passes through silicon oil C, exits from transparent container 3 through the exit wall 3B, and enters galilean telescope 8. Only the Y-axis component of laser beam L2 is modified by the Galilean telescope 8, and the reflection sensitivity of the Y-axis component becomes multiplied by 1.4142. Consequently, the reflection-angular change θ2y (=1.4142nθ1) becomes 2nθ1, which is the same as the change θ2x (=2nθ1) in the angle of reflection of X-axis component.

Thus, the laser beam L2, having exited through the transparent container 3, is made uniform by the galilean telescope 8 to have equal reflection sensitivity in all directions. The uniform laser beam L3 enters the roof prism 6 with an angle θ3=2nθ1.

Laser beam L3 is inverted and reflected by the roof prism 6, advances in the horizontal direction, and enters half prism 9, which further reflects the laser beams L3.

The laser beam L3 reflected by the half prism 9 advances vertically upward, enters the bottom wall 3C of transparent container 3 at a substantially right angle, and passes through silicon oil C and the free liquid surface C1 from bottom to top.

Since both the X and Y-axis components of laser beams L3 are inverted, the laser beam L3 is refracted by silicon oil C having a free liquid surface C1 in the opposite direction to the change in the incident angle. By passing through silicon oil C and the free liquid surface C1, the laser beam L3 becomes a laser beam in which the angle is changed by θ4 represented by the expression (3'), and strikes the reflecting mirror surface 3D' of the top wall 3D.

$$θ4=2nθ1-(n-1)θ1=(n+1)θ1 \tag{3'}$$

The laser beam L3 reflected by the reflecting mirror surface 3D' takes a different light path from the entering path, enters the free liquid surface C1, and passes through silicon oil C and the free liquid surface C1 from top to bottom.

Similar to the first penetration, the laser beam L3 is refracted again by silicon oil C having the free liquid surface C1 in the opposite direction to the angular change of laser beam L3, because both the X and Y-axis components of laser beam L3 are inverted. By passing through the free liquid surface C1 and silicon oil C, the laser beam L3 becomes Laser beam L4, in which the angle is changed by 5 represented by the expression (4')

$$θ5=(N+1)θ1-(n-1)θ1=2θ1 \tag{4'}$$

The laser beam L4 exits from the bottom wall 3C, and enters half prism 9. The laser beam L4 further passes through the half prism 9, and enters the beam expander 12 in the state of slanting by an angle θ5 relative to the vertical axis.

Focal length f2 of convex lens 12A of beam expander 12 is 10 mm, while the focal length f3 of convex lens 12B is 20 mm. Because of the relationship f2:f3=1:2, the angle of slant θ6 of laser beam L5 having exited from the convex lens 12B of beam expander 12 is expressed as follows:

$$θ6=2θ1*f2/f3=θ1 \tag{5'}$$

At the same time, the exit direction of laser beam L5 is inverted (because the change direction of the angle of slant θ6 is opposite to the slanting direction of the corrector by θ1), thereby correcting the inclination of angle θ1.

Figure 9:
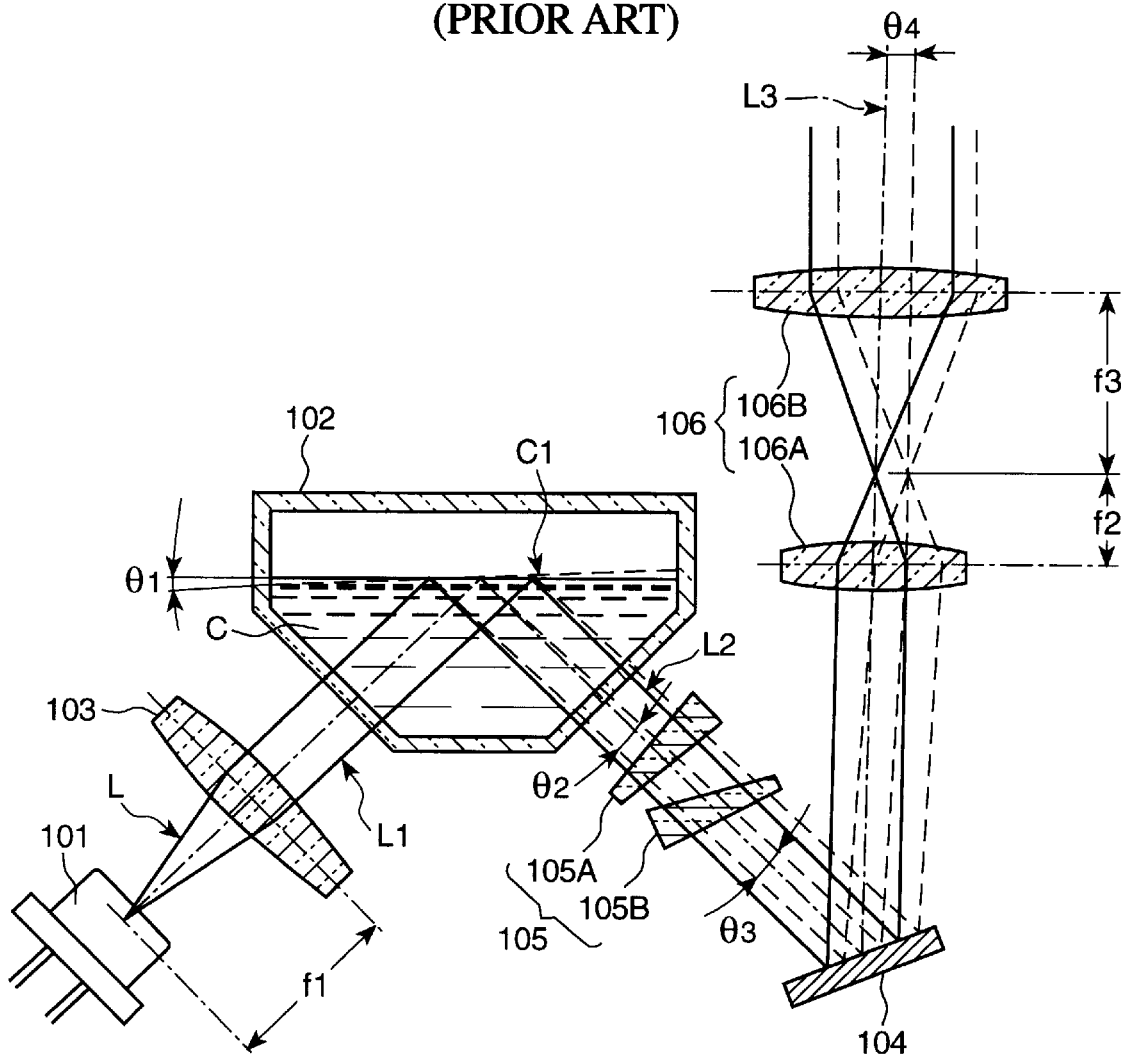
FIG. 9 shows a prior art automatic inclination corrector.
Figure 10:
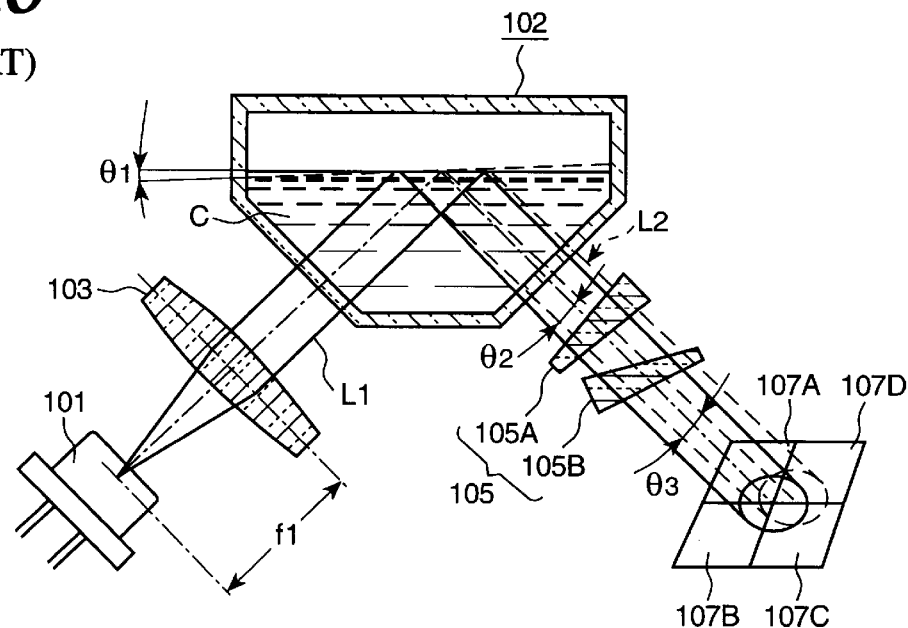
FIG. 10 shows a prior art inclination sensor.

The expression (5') does not contain the refractive index n of silicon oil C, unlike the expression (1) obtained from the prior art inclination corrector shown in FIG. 9. Therefore, even if the refractive index n of silicon oil C varies due to a change in temperature, accuracy of inclination correction is maintained without being affected by a corresponding change in the refractive index.

In the third embodiment, laser beam L3 inverted by roof prism 6, passes twice through the silicon oil C and the free liquid surface C1. This has a function of removing the influence of the refractive index n of silicon oil C to the laser beam L4 which exits from the transparent container 3 vertically downward (i.e., laser beam emitted from the corrector). Furthermore, beam expander 12 gives an angular change to the laser beam L4 which passes twice through the silicon oil C. This makes the laser beam L4 advance always vertically downward. Laser beam L1 emitted from the laser diode 1 enters the free liquid surface C1 with an incident angle of 45 degrees. Even if the refractive index n changes due to a change in temperature, accurate inclination correction is performed without influence due to the temperature change. Furthermore, as compared with the second embodiment shown in FIG. 3, the structure becomes simpler because the reflecting mirror 5 is omitted, which results in further reduced cost.

Figure 5:
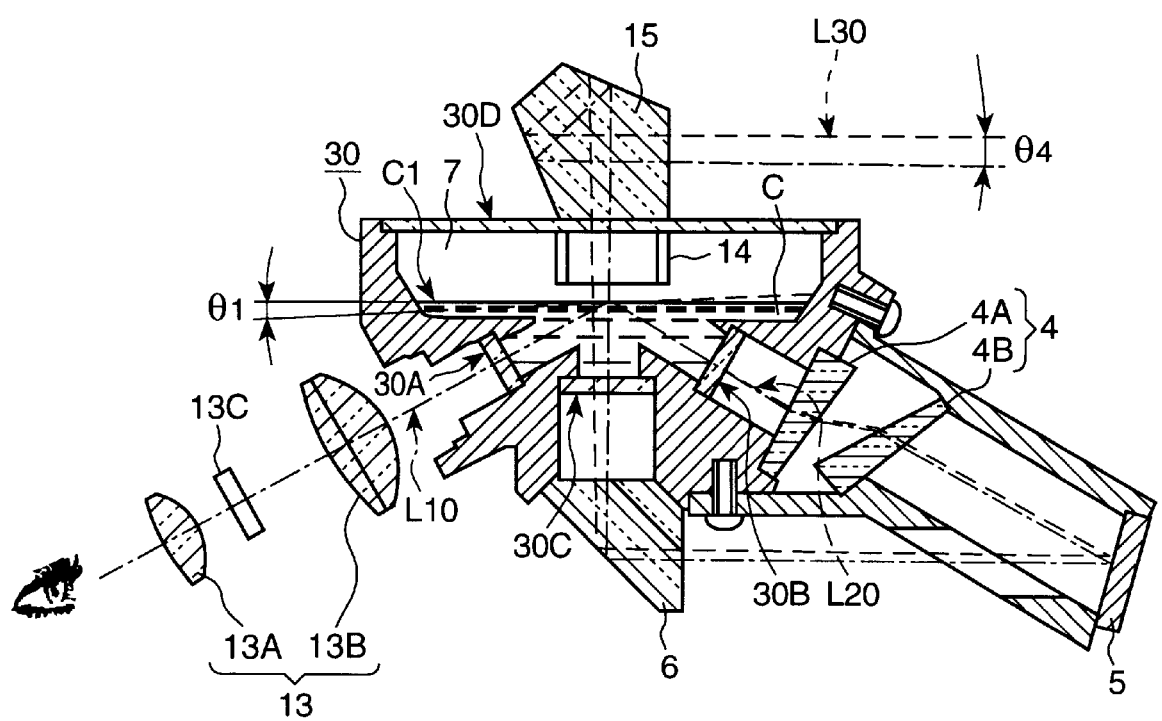
FIG. 5 shows an application example of the automatic inclination corrector of FIG. 1.

FIG. 5 shows an application of the automatic inclination corrector of the first embodiment (FIG. 1) to an optical leveler. The optical leveler includes a collimation telescope 13 composed of an eye lens 13A, a scale plate 13B and an object lens 13C. Silicon oil C is sealed within a container 30 made from aluminum die-cast so that space 7 is formed above the silicon oil surface.

The telescope 13 is arranged so that light L10 along the optical axis of the telescope 13 enters the free liquid surface C1 with an incident angle of 60 degrees. The container 30 includes a glass window 30A, through which light L10 enters at a right angle, glass window 30B, through which light L20, obtained as a result of total reflection of light L10 at the free liquid surface C1, enters at a right angle, bottom glass window 30C, and top glass window 30D substantially parallel to the bottom glass window 30C. These glass windows 30X through 30D are fixed to the container 30.

Cylindrical cover 14 is fixed to the bottom surface of the top glass window 30D to prevent silicon oil C from sticking to the top glass window 30D, which causes the optical image to be distorted. Penta-prism 15 is fixed to the top surface of the top glass window 30D for changing the horizontal light path to the vertical light path.

Operation of the optical leveler will be described. The operator can observe and collimate the target image which enters the penta prism 15 from the horizontal direction by looking through the eye lens 13A.

The optical leveler has a built-in automatic inclination corrector as described by the first embodiment. Therefore, inclination correction for the optical leveler is automatically performed. Even if the optical leveler is slanted by θ1, the operator simply observes the target image, which enters the penta prism 15, through the eye lens 13A, and can collimate the target image. Even if the refractive index n of the silicon oil C changes due to a change in temperature, it does not affect the accuracy of inclination correction. This allows the target image to be always collimated with high accuracy.

(Fourth Embodiment)

Figure 6:
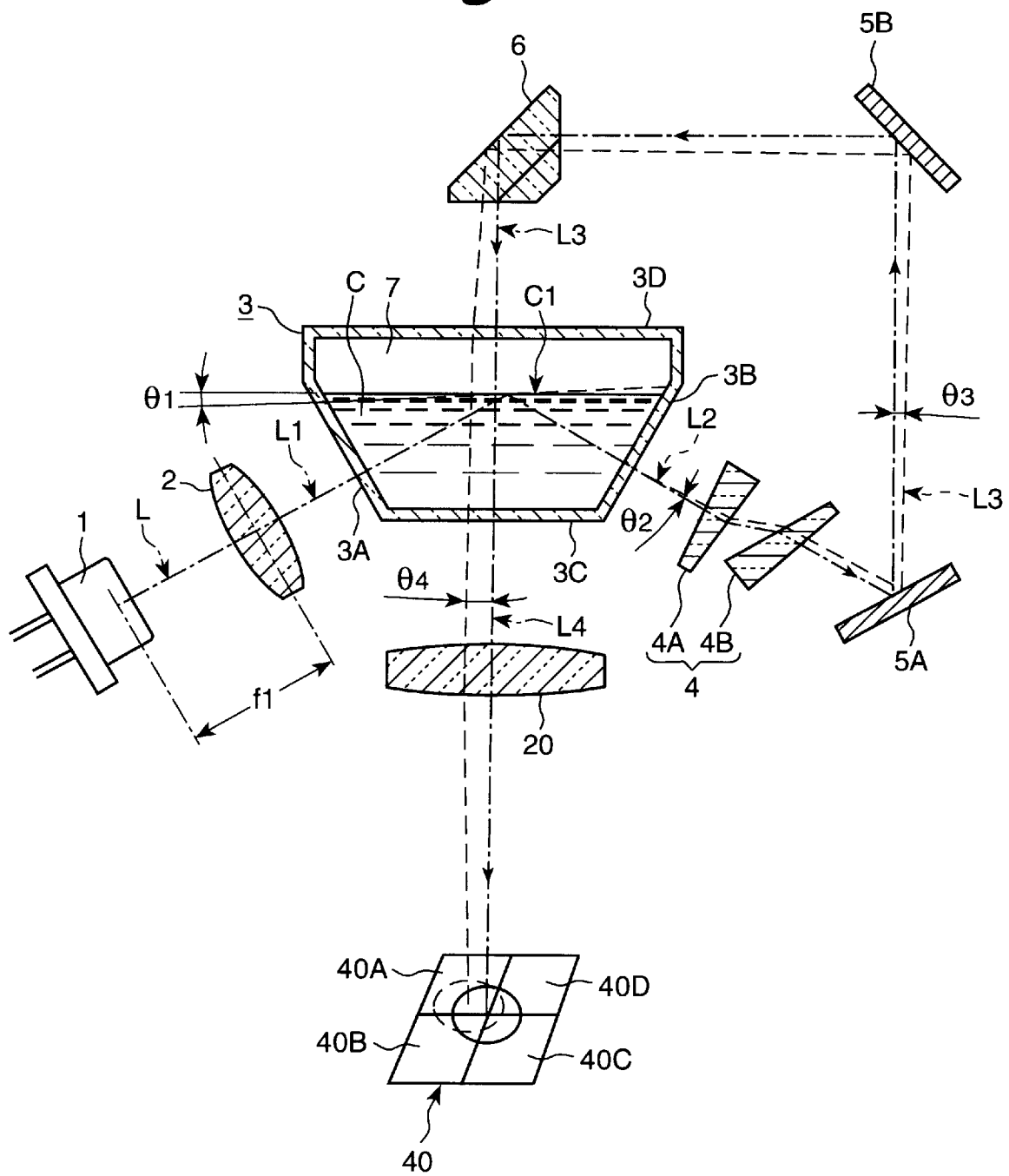
FIG. 6 shows the overall structure of the automatic inclination corrector according to the fourth embodiment.

FIG. 6 shows an inclination sensor according to the fourth embodiment. The inclination sensor is built in various optical instruments to detect inclination angles in two axis directions (X and Y-axis directions) of the optical instrument.

The inclination sensor uses the automatic inclination corrector of the first embodiment showing in FIG. 1, and includes all the elements composing the automatic inclination corrector, except this embodiment utilizes two reflecting mirrors 5A and 5B, instead of the reflecting mirror 5. Similar to the automatic inclination corrector of the first embodiment, the laser beam L1 which passes through the collimation lens 2 enters the free liquid surface C1 with an incident angle of 60 degrees.

The inclination sensor is structured so that laser beam L3 inverted by roof prism 6 enters the top wall 3D of transparent container 3. For this purpose, the roof prism 6 is positioned above the transparent container 3, and reflecting mirror 5A for reflecting laser beam L2 from anamorphic prism 4 vertically upward, and reflecting mirror 5B for reflecting laser beam L3 from the reflecting mirror 5A in the horizontal direction toward the roof prism 6 are provided.

The inclination sensor further comprises a projection lens 20 positioned right below the transparent container 3.and a quadrant light-receiving element 40 positioned right under the projection lens 20 to detect inclination in two axis directions.

The projection lens 20 is used to project the laser beam L4 having exited from the transparent container 3 through the bottom wall 3C onto the light-receiving element 40, and has a projection magnification f2*tanθ4 (f2:focal length of projection lens 20). The quadrant light-receiving element 40 is composed of four light-receiving elements 40A, 40B, 40C and 40D, which are divided by two orthogonal lines. Light-receiving elements 40A and 40C detect the inclination in the Y-axis direction, and light-receiving elements 40B and 40D detect the inclination in the X-axis direction.

The inclination sensor 40 further comprises a first inclination angle calculator (not shown) for calculating the inclination angle of the Y-axis direction based on the difference between the outputs from the light-receiving elements 40A and 40C, a second inclination angle calculator (not shown) for calculating the inclination angle of X-axis direction based on the difference between the outputs from the light-receiving elements 40B and 40D, and a display for displaying the inclination angles in X and Y-axis directions calculated by the first and second calculators.

The quadrant light-receiving element 40 is fixed within the optical instrument, together with the other elements composing the inclination sensor. The inclination sensor is adjusted so that when the inclination angle is zero (θ1=0), laser beam L4 having exited from the transparent container 3 through the bottom wall 3C strikes the center of the quadrant light-receiving element 40 (the intersection of two dividing lines), through the projection lens 20.

Operation of the inclination sensor in the fourth embodiment will be described. When the entire sensor is slanted by an angle θ1, the free liquid surface C1 of silicon oil C slopes by an angle θ1 relative to the transparent container 3, because the free liquid surface C1 tends to be maintained horizontal.

Similar to the first embodiment of FIG. 1, laser beam L2, having exited from the transparent container 3 after total reflection at the free liquid surface C1, is made uniform by the anamorphic prism 4 so that the reflection sensitivities become equal in all directions, and strikes the reflecting mirror 5A with an angle θ3=nθ1.

The laser beam L3 reflected by the reflecting mirror 5A advances upward in the vertical direction, and is further reflected by the reflecting mirror 5B in the horizontal direction and enters the roof prism 6. Both the X and Y-axis components of the laser beam L3 are inverted by the roof prism 6, while being reflected downward. The inverted laser beam L3 enters the top wall 3D of the transparent container 3 at a substantially right angle, and passes through the free liquid surface C1 and silicon oil C from top to bottom.

Since both the X and Y-axis components of the laser beam L3 were inverted, the laser beam L3 is refracted by the silicon oil C having a free liquid surface C1 slanting by θ1 relative to the transparent container 3, in the opposite direction to the angular change of the laser beam L3. In other words, by passing through the silicon oil C and the free liquid surface C1 once, the laser beam L3 becomes a laser beam L4 with an angular change of θ4 expressed by the expression (2A), which is the same as expression (2), and exits through the bottom wall 3C of the transparent container 3 downward.

$$\theta4=n\theta1-(n-1)\theta1 \tag{2A}$$

From the expression (2A), the following relationship is established.

$$\theta4=\theta1 \tag{2A'}$$

Furthermore, because the direction of the laser beam L4 has changed by θ4 in the opposite direction to the angle of slope θ1 of the inclination corrector, laser beam L4 exits from the container 3 through the bottom wall 3C downward in the vertical direction.

Laser beam L4 enters the quadrant light-receiving element 40 through the projection lens 20. Since the quadrant light-receiving element 40 is slanted by θ1, like any other element, the laser beam L4 having exited from the bottom wall 3C vertically downward strikes a position shifting from the center of the quadrant light-receiving element 40. Accordingly, output differences are generated between the light-receiving elements 40A and 40C, and between the light-receiving elements 40B and 40D. An angle of inclination in the Y-axis direction is calculated based on the difference between the outputs from the light-receiving elements 40A and 40C, and an angle of inclination in the X-axis direction is calculated based on the difference between the outputs from the light-receiving elements 40B and 40D. These values are displayed on a display unit.

In the inclination sensor, the expression (2A) does not contain the refractive index n of silicon oil C. Therefore, laser beam L4 always exits from the bottom wall 3C of the transparent container 3 vertically downward even if the refractive index n varies due to a change in temperature. Inclination angles in two axis directions are detected with high accuracy without being affected by the change in the refractive index n due to a change in temperature.

(Fifth Embodiment)

Figure 7:
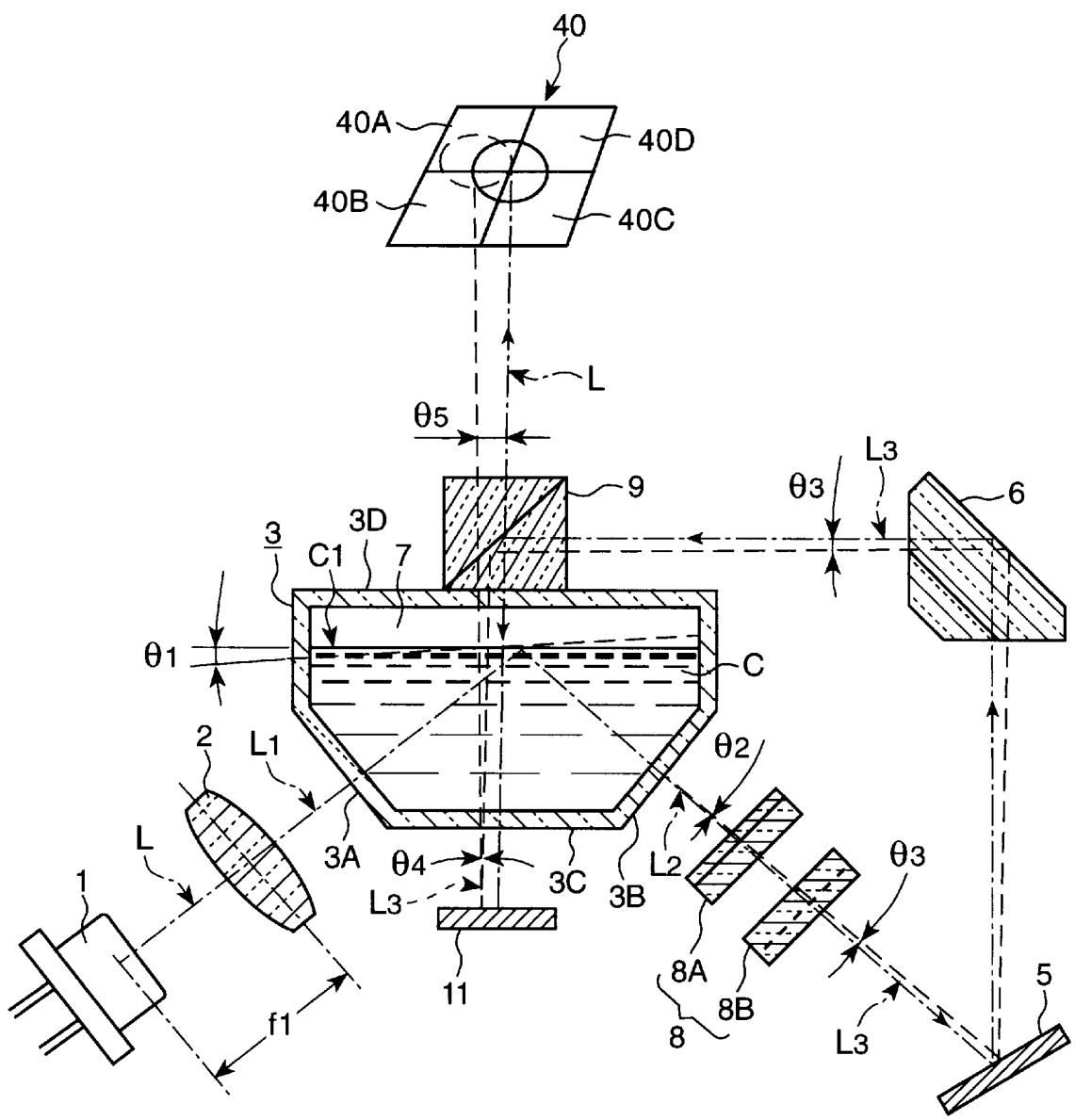
FIG. 7 shows the overall structure of the inclination sensor according to the fifth embodiment.

FIG. 7 shows an inclination sensor according to the fifth embodiment. The inclination sensor uses the automatic inclination corrector of the second embodiment shown in FIG. 3, and includes all the elements of the automatic inclination corrector in the same configuration, except for the beam expander 10. Similar to the automatic inclination corrector of the second embodiment, the laser beam L1 passing through the collimation lens 2 enters the free liquid surface C1 at an incident angle of 45 degrees.

The inclination sensor comprises a quadrant light-receiving element 40 positioned right above the half prism 9. The inclination sensor is adjusted so that when the inclination angle is zero (θ1=0), the laser beam L5 having exited from the half prism 9 vertically upward strikes the center of the quadrant light-receiving element 40.

Operation of the inclination sensor of the fifth embodiment will be described. When the entire sensor is slanted by an angle θ1, the free liquid surface C1 of silicon oil C slopes by an angle θ1 relative to the transparent container 3, because the free liquid surface C1 tends to be maintained horizontal. Similar to the second embodiment of FIG. 3, laser beam L2, having exited from the transparent container 3 after total reflection at the free liquid surface C1, is made uniform by the Galilean telescope 8 so that the reflection sensitivities become equal in all directions, and strikes the reflecting mirror 5 with an angle θ3=2nθ1.

Both the X and Y-axis components of the laser beam L3 reflected by the reflecting mirror 5 are inverted by roof prism 6. At the same time, the laser beam L3 is reflected by the roof prism 6 in the horizontal direction toward the half prism 9. The inverted laser beam L3 is reflected by the half prism 9 vertically downward, enters the top wall 3D of the transparent container 3 at a substantially right angle, and passes through the free liquid surface C1 and silicon oil C from top to bottom.

Since both the X and Y-axis components of the laser beam L3 were inverted, the laser beam L3 is refracted by the silicon oil C having a free liquid surface C1 slanting by ei relative to the transparent container 3, in the opposite direction to the angular change of laser beam L3. In other words, by passing through the silicon oil C and the free liquid surface C1, the laser beam L3 is changed by θ4 as expressed by the expression (3A), which is the same as expression (3).

$$\theta4=2n\theta1-(n-1)\theta1=(n+1)\theta1 \tag{3A}$$

In this state, the laser beam L3 exits from the transparent container 3 through the bottom wall 3C downward, and enters the second reflecting mirror 11. The laser beam L3 reflected by the second reflecting mirror 11 takes a different light path from the entering path, enters the transparent container 3 through the bottom wall 3C, and passes through the silicon oil C and the free liquid surface C1 from bottom to top.

Similar to the first penetration, the laser beam L3 is refracted again by the free liquid surface C1 of silicon oil C in the opposite direction to the angular change of laser beam L3, because both the X and Y-axis components of the laser beam L3 are inverted. By passing through silicon oil C and the free liquid surface C1, the laser beam L3 becomes laser beam L4 with an angular change of θ5 represented by the expression (4A), which is the same as the expression (4). Laser beam L4 then passes through the top wall 3D of the transparent container 3 and the half prism 9 upward.

$$\theta5=(N+1)\theta1-(n-1)\theta1=2\theta1 \tag{4A}$$

Laser beam L4 enters the quadrant light-receiving element 40 at an angle θ5. Laser beam L4 strikes a position shifting from the center of the quadrant light-receiving element 40, depending on the angle θ5 (=2θ1). Accordingly, output differences are generated between the light-receiving elements 40A and 40C, and between the light-receiving elements 40B and 40D. Inclination angles in the Y-axis direction and the X-axis direction are calculated based on the differences between the outputs of light-receiving elements 40A and 40C, and between the output of the light-receiving elements 40B and 40D, respectively. These values are displayed on a display unit.

In the inclination sensor, the expression (4A) does not contain the refractive index n of silicon oil C. Therefore, laser beam L4 always enters the quadrant light-receiving element 40 with an angle θ5 corresponding to the inclination angle θ1 of the sensor. Inclination angles in two axis directions are detected with high accuracy without being affected by the change in the refractive index n due to a temperature change.

Furthermore, as compared with the fourth embodiment of FIG. 6, one reflecting mirror is removed from the sensor. This further simplifies the structure and reduces cost.

(Sixth Embodiment)

Figure 8:
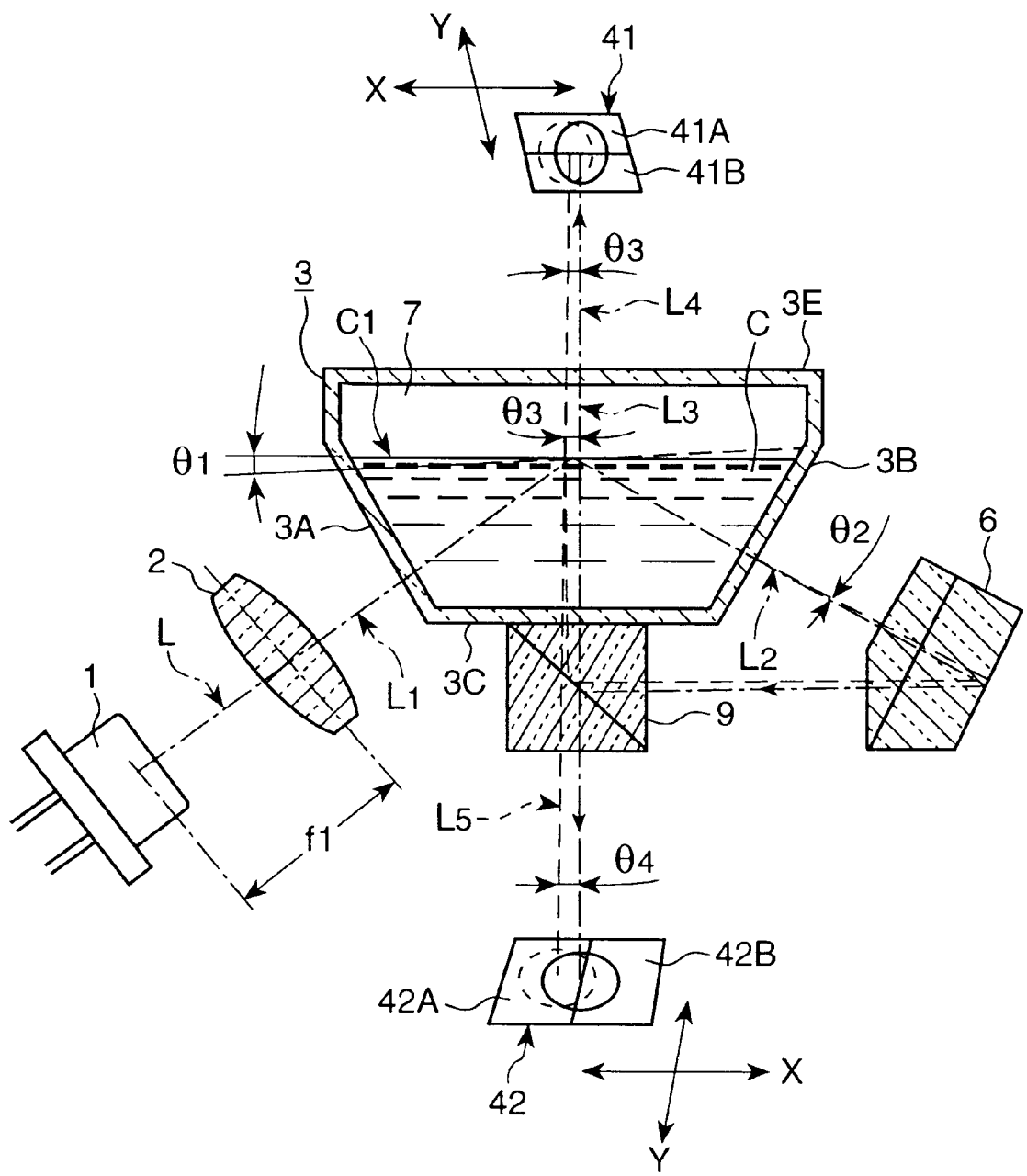
FIG. 8 shows the overall structure of the inclination sensor according to the sixth embodiment.

FIG. 8 shows an inclination sensor according to the sixth embodiment. The inclination sensor uses the automatic inclination corrector of the third embodiment shown in FIG. 4, and includes all the elements of the automatic inclination corrector, except for the Galilean telescope 8 and beam expander 12. Similar to the automatic inclination corrector of the third embodiment, the laser beam L1 passing through the collimation lens 2 enters the free liquid surface C1 with an incident angle of 45 degrees.

The inclination sensor is structured so that the laser beam L2, which exits from the exit wall 3B of transparent container 3 after total reflection at the free liquid surface C1, is inverted by the roof prism 6, while being reflected in the horizontal direction to enter the half prism 9 fixed to the bottom wall 3C of transparent container 3. The laser beam L2 is reflected by the half prism 9 vertically upward, enters the bottom wall 3C of transparent container 3 as a laser beam L3, and passes through the silicon oil C and the free liquid surface C1 from bottom to top. A portion of laser beam L3 further passes through the half mirror 3E of transparent container 3 and advances vertically upward, and a portion of laser beam L3 is reflected by the half mirror 3E. The reflected laser beam L3 passes through the free liquid surface C1 and silicon oil C again from top to bottom.

Right above the transparent container 3, bisected light-receiving element (first light-receiving element) 41 is positioned for detecting an inclination in the Y-axis direction. Right under the half prism 9, bisected light-receiving element (second light-receiving element) 42 is positioned for detecting an inclination in the X-axis direction. The bisected light-receiving element 41 is composed of two light-receiving elements 41A and 41B, which are separated by a line along the X-axis. The bisected light-receiving element 42 is composed of two light-receiving elements 42A and 42B, which are separated by a line along the Y-axis. The angle of inclination in the Y-axis direction is calculated based on the difference between outputs of the light-receiving elements 41A and 41B by an inclination angle calculator (not shown), and an angle of inclination in the X-axis direction is calculated based on the difference between outputs of the light-receiving elements 42A and 42B by an inclination angle calculator (not shown).

The inclination sensor is adjusted so that when the inclination angle is zero ($\theta 1=0$), laser beam L4 having exited from the half mirror 3E fixed to the transparent container 3 vertically upward strikes the center of the bisected light-receiving element 41 (the middle of the dividing line), and laser beam L5 reflected by half prism 9 vertically downward strikes the center of the bisected light-receiving element 42 (the middle of the dividing line).

The operation of the automatic inclination corrector will be described. When the sensor is slanted by an angle $\theta 1$, the free liquid surface C1 of the silicon oil C slopes by $\theta 1$ relative to the transparent container 3 because the free liquid surface C1 tends to be maintained horizontal. Among the laser beam L2 which exits from the exit wall 3B of transparent container 3 after total reflection at the free liquid surface C1, a change $\theta 2x$ in the angle of reflection of the X-axis component is expressed as $\theta 2x=2n\theta 1$, and a change $\theta 2y$ in the angle of reflection of the Y-axis component is expressed as $\theta 2y=1.4142n\theta 1$. Laser beam L2 having X and Y-axis light components with different reflection sensitivities enters roof prism 6. More particularly, the X-axis component of laser beam L2 enters roof prism 6 with an angle $\theta 2x=2n\theta 1$, and the Y-axis component of laser beam L2 enters roof prism 6 with an angle $\theta 2y=1.4142n\theta 1$.

The laser beam L2 is inverted by roof prism 6 in both the X and Y-axis components, while being reflected in the horizontal direction toward half prism 9, which then reflects the laser beam L2 upward. The reflected laser beam L2 advances vertically upward, enters the bottom wall 3C of transparent container 3, and passes through silicon oil C and the free liquid surface C1 from bottom to top.

Since both the X and Y-axis components of laser beams L2 are inverted, the laser beam L2 is refracted by silicon oil C having a free liquid surface C1 in the opposite direction to the change in the laser beam L2. By passing through silicon oil C and the free liquid surface C1, the laser beam L2 becomes a laser beam L3 containing angular changes $\theta 3x$ and $\theta 3y$ in X and Y-axis directions, respectively, as expressed by the expression (6) and (7), and enters half mirror 3E.

$$\theta 3x=2n\theta 1-(n-1)\theta 1=(n+1)\theta 1 \tag{6}$$

$$\theta 3y=n\theta 1-(n-1)\theta 1=\theta 1 \tag{7}$$

A portion of laser beam L3 passes through half mirror 3E, and another portion of laser beam L3 is reflected by the half mirror 3E. Laser beam L4 passing through half mirror 3E advances upward and enters bisected light-receiving element 41. Because the light-receiving element 41 is divided by a line along the X-axis into two light-receiving elements 41A and 41B, it does not detect the angle of inclination in the X-axis direction ($\theta 3x$), but detects only the angle of inclination in the Y-axis direction ($\theta 3y$). From the expression (7), the following relationship is established.

$$\theta 3y=\theta 1 \tag{7'}$$

The direction of angular change $\theta 3y$ is opposite to the direction of inclination angle $\theta 1$. Laser beam L4 passing through half mirror 3E exits from the half mirror 3E vertically upward. Since the bisected light-receiving element 41 is slanted by $\theta 1$, like any other elements, the laser beam L4 strikes a position shifting from the center of the bisected light-receiving element 41. As a result, an output difference is generated between the light-receiving elements 41A and 41B. An angle of inclination in the Y-axis direction ($\theta 3y=\theta 1$) is calculated based on this output difference, and a calculation result is displayed on the display unit.

On the other hand, a portion of laser beam L3 reflected by half mirror 3E takes a different light path from the entering path, enters the free liquid surface C1, and passes through silicon oil C and the free liquid surface C1 from top to bottom.

Similar to the first penetration, the laser beam L3 is refracted again by silicon oil C having the free liquid surface C1 in the opposite direction to the angular change of laser beam L3, because both the X and Y-axis components of laser beam L3 are inverted. By passing through the free liquid surface C1 and silicon oil C, the laser beam L3 changes in the X and Y-axis directions by $\theta 4x$ and $\theta 4y$ represented by the expressions (8) and (9), respectively, and exits the half prism 9 downward as a laser beam L5.

$$\theta 4x=(n+1)\theta 1-(n-1)\theta 1=\theta 1 \tag{8}$$

$$\theta 4y=\theta 1-(n-1)\theta 1=(2-n)\theta 1 \tag{9}$$

Laser beam L5 having exited from half mirror 3E downward enters bisected light-receiving element 42. Because the light-receiving element 42 is divided by a line along the Y-axis into two light-receiving elements 42A and 42B, it does not detect the angle of inclination in the Y-axis direction (4y), but detects only the angle of inclination in the X-axis direction (4x).

From the expression (8), the following relationship is established.

$$\theta 4x=\theta 1 \tag{8'}$$

The direction of angular change $\theta 4x$ is opposite to the direction of inclination angle $\theta 1$. Therefore, laser beam L5 exits from the half mirror 3E vertically downward. Since the bisected light-receiving element 42 is slanted by $\theta 1$, like any other elements, the laser beam L5 strikes a position shifting from the center of the bisected light-receiving element 42. As a result, an output difference is generated between the light-receiving elements 42A and 42B. An angle of inclination in the X-axis direction ($\theta 4x=\theta 1$) is a calculated based on this output difference, and a calculation result is displayed on the display unit.

In the inclination sensor, the expressions (7') and (8') do not contain the refractive index n of silicon oil C. Therefore, laser beams L4 and L5 exit vertically downward from the transparent container 3, even when the refractive index n varies due to a change in temperature. Thus, accuracy in inclination detection is not affected by a change in the refractive index n caused by a corresponding temperature change. Detection of inclination angles in the X and Y-axis directions is performed always with high accuracy.

Furthermore, the X-axis component and the Y-axis component having different reflection sensitivities are separately guided to the bisected light-receiving elements 41 and 42, respectively. This can eliminate the Galilean telescope 8 used in the fifth embodiment of FIG. 7, resulting in a further simplified structure and a further reduction in cost. Light-receiving elements used in the fourth, fifth and sixth embodiments may be line sensors or charge coupled devices (CCD).

(Seventh Embodiment)

Figure 11:
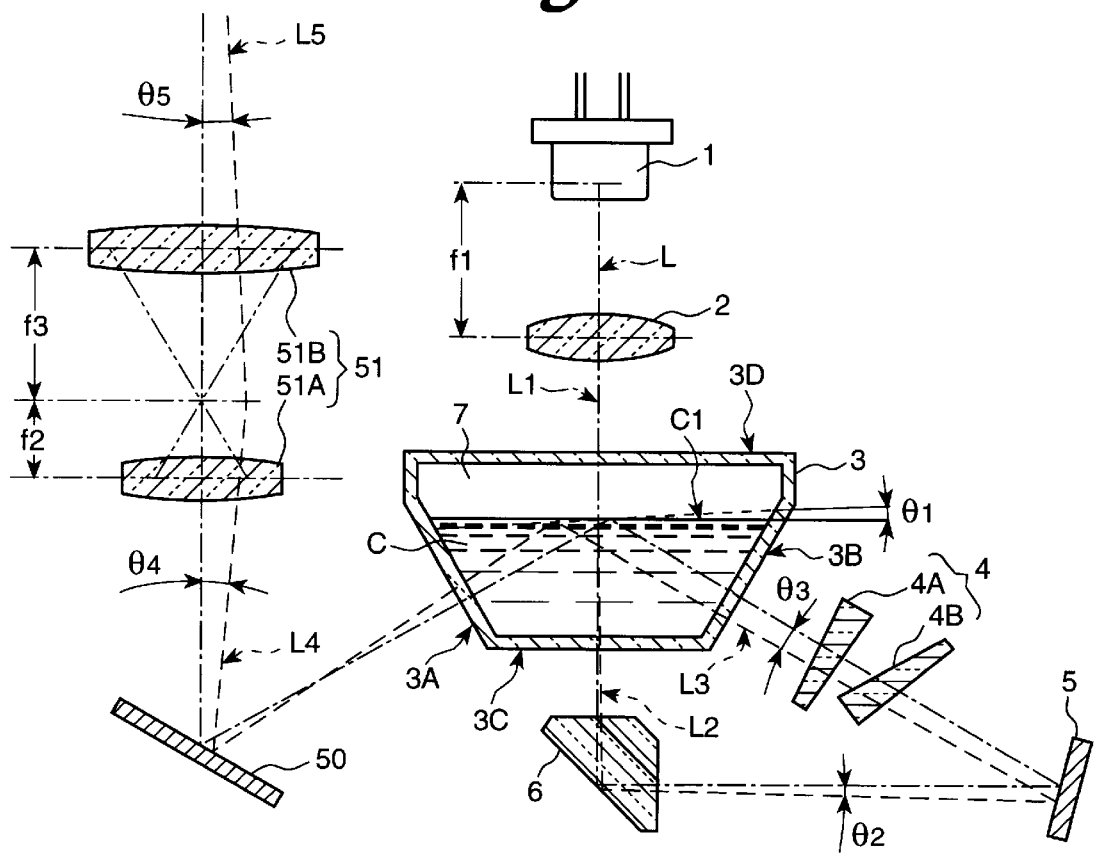
FIG. 11 shows the principle structure of the automatic inclination corrector according to the seventh embodiment.

FIG. 11 shows the automatic inclination corrector according to the seventh embodiment, which can be built in various optical instruments.

The automatic inclination corrector of FIG. 11 comprises a laser diode 1, a transparent container 3 for storing silicon oil C having a free liquid surface C1, a collimation lens (light projection system) 2 for guiding the laser beam L from the laser diode 1 to the free liquid surface C1 with a right angle, an anamorphic prism 4, reflecting mirrors 5, 50, a roof prism 6, and a beam expander 51 composed of cylindrical lenses 51A and 51B.

A laser diode 1 is arranged so that the laser beam L is emitted downward. A collimation lens 2 is positioned so that the focal point f1 of the collimation lens 2 coincides with the position of light source (laser diode 1). In this structure, the laser beam L1 which exits from the collimation lens 2 becomes parallel light, and enters the free liquid surface C1 at a substantially right angle.

A transparent container 3 is made of glass. The transparent container 3 is sealed up, and has a top wall 3D arranged perpendicular to the laser beam L1, a bottom wall 3C parallel to the top wall 3D, slanting side walls 3B and 3A with slopes of 60 and –60 degrees, respectively, with respect to the bottom wall 3C. Silicon oil C is stored in the transparent container 3 so that a space 7 is formed between the silicon oil surface and the top wall 3D of the sealed container 3.

A roof prism 6 inverts the light components of two axis directions of a laser beam which passes through the transparent container 3, while reflecting the laser beam in the horizontal direction toward the reflecting mirror 5.

An anamorphic prism 4 is positioned in the light path of the laser beam L2 which passes through the free liquid surface C1 and is reflected by roof prism 6 and the reflecting mirror 5. The anamorphic prism 4 changes the refraction sensitivities of two orthogonal light components (X and Y-axis directions) of the laser beam which is refracted in the silicon oil C having a free liquid surface C1. The anamorphic prism 4 is composed of wedge prisms 4A and 4B to make the laser beam L3 enter the slanting side wall 3B of transparent container 3 at a normal angle.

The anamorphic prism 4 is designed to double the angle of refraction of the X-axis light component, and the angle of refraction of Y-axis light component is not affected by the anamorphic prism 4. Reflecting mirror 50 reflects the laser beam L4, which exits from the transparent container 3 after total reflection at the free liquid surface C1, in the vertical direction.

Beam expander 51 is composed of two convex cylindrical lenses 51A and 51B, and is used to make the reflection sensitivities of two orthogonal light components (X and Y-axis directions) of the laser beam totally reflected by the free liquid surface C1 equal to each other.

Beam expander 51 is designed to change the reflection sensitivity of the X-axis light component to ½. The reflection sensitivity of the Y-axis light component is not affected by the beam expander 51. The operation of the automatic inclination corrector of the seventh embodiment will be described.

If the entire corrector is slanted by an angle θ1, the corrector slopes by θ1 relative to the free liquid surface C1 of silicon oil C, because the free liquid surface C1 maintains a horizontal orientation. In FIG. 11, to simplify the explanation and drawing, the inclination of angle θ1 of the free liquid surface C1 is indicated by the broken line, relative to the horizontal line indicated by the solid line.

Laser beam L emitted from the laser diode 1 is collimated by the collimation lens 2 and becomes a parallel light beam L1. The laser beam L1 enters the top wall 3D of transparent container 3, passes through silicon oil C having the free liquid surface C1, and exits from the bottom wall 3C downward, as a laser beam L2. The laser beam L2 enters roof prism 6.

Both the X and Y-axis components of laser beam L2 are inverted by roof prism 6, and at the same time, the laser beam L2 is reflected in the horizontal direction toward reflecting mirror 5, and is guided to anamorphic prism 4. The angle of the refraction of the laser beam L2 by the silicon oil C is expressed as follows:

$$\theta 2 = (n-1)\theta 1$$

(n: the refractive index of silicon oil C)

The angle of refraction of only the X-axis component of the laser beam L2 is doubled by anamorphic prism 4. Accordingly, θ3x is expressed as follows:

$$\theta 3x = 2\theta 2 = 2(n-1)\theta 1$$

The Y-axis component does not change, and θ3y is expressed as:

$$\theta 3y = \theta 2 = 2(n-1)\theta 1$$

Thus, laser beam L2 having passed through the silicon oil C is modified by the anamorphic prism 4 so that the refraction angle sensitivities in the X and Y-axis directions are changed, and again enters the transparent container 3 through the slanting side wall 3B.

The laser beam L3 enters the free liquid surface C1 through silicon oil C. The incident angle is changed by θ1 from the original incident angle 60 degrees in the non-slanting state. Laser beam L3 enters the free liquid surface C1 with an angle of substantially 60 degrees (in FIG. 11, with an incident angle of 60−θ1+θ3 degrees) and is totally reflected.

Among the laser beam totally reflected at the free liquid surface C1, the sensitivity of the total reflection angle θ4x of the X-axis direction is expressed as follows:

$$\begin{aligned}\theta 4x &= 2n\theta 1 - \theta 3x \\ &= 2n\theta 1 - 2(n-1)\theta 1 \\ &= 2\theta 1\end{aligned}$$

The sensitivity of the total reflection angle θ4y of the Y-axis direction is expressed as follows:

$$\theta 4y = n\theta 1 - \theta 3y$$
$$= n\theta 1 - (n-1)\theta 1$$
$$= \theta 1$$

As a result, the laser beam L4 having exited from the transparent container 3 has twice the reflection sensitivities in the X-axis direction. Laser beam L4 is further reflected by the reflecting mirror 50 vertically upward and enters beam expander 51.

Cylindrical lenses 51A and 51B which compose beam expander 51 are convex lenses having a curvature only in the X-axis direction. The lenses 51A and 51B have focal lengths f2 and f3, respectively, and their focal points coincide with each other. The relationship between the focal lengths f2 and f3 of cylindrical lenses 51A and 51B are f2:f3=1:2. Therefore, the angular magnification of the X-axis component becomes ½. The angle θ5 of the laser beam L5 having passed through beam expander 51 is expressed as follows:

$$\theta 5x = \theta 4x * 1/2$$
$$= 2\theta 1 * 1/2 = \theta 1$$
$$\theta 5y = \theta 4y * 1$$
$$= \theta 1$$

Laser beam L5 exits the beam expander 51 vertically upward. As a result, the inclination of the optical instrument having the internal automatic inclination corrector is corrected. Furthermore, since the expressions of θ5x, θ5y do not contain the refractive index n of silicon oil C, the change of refractive index due to temperature change does not affect the exit direction of laser beam L5. Thus, the inclination correction is performed with high accuracy regardless of the temperature of the environment.

(Eighth Embodiment)

Figure 12:
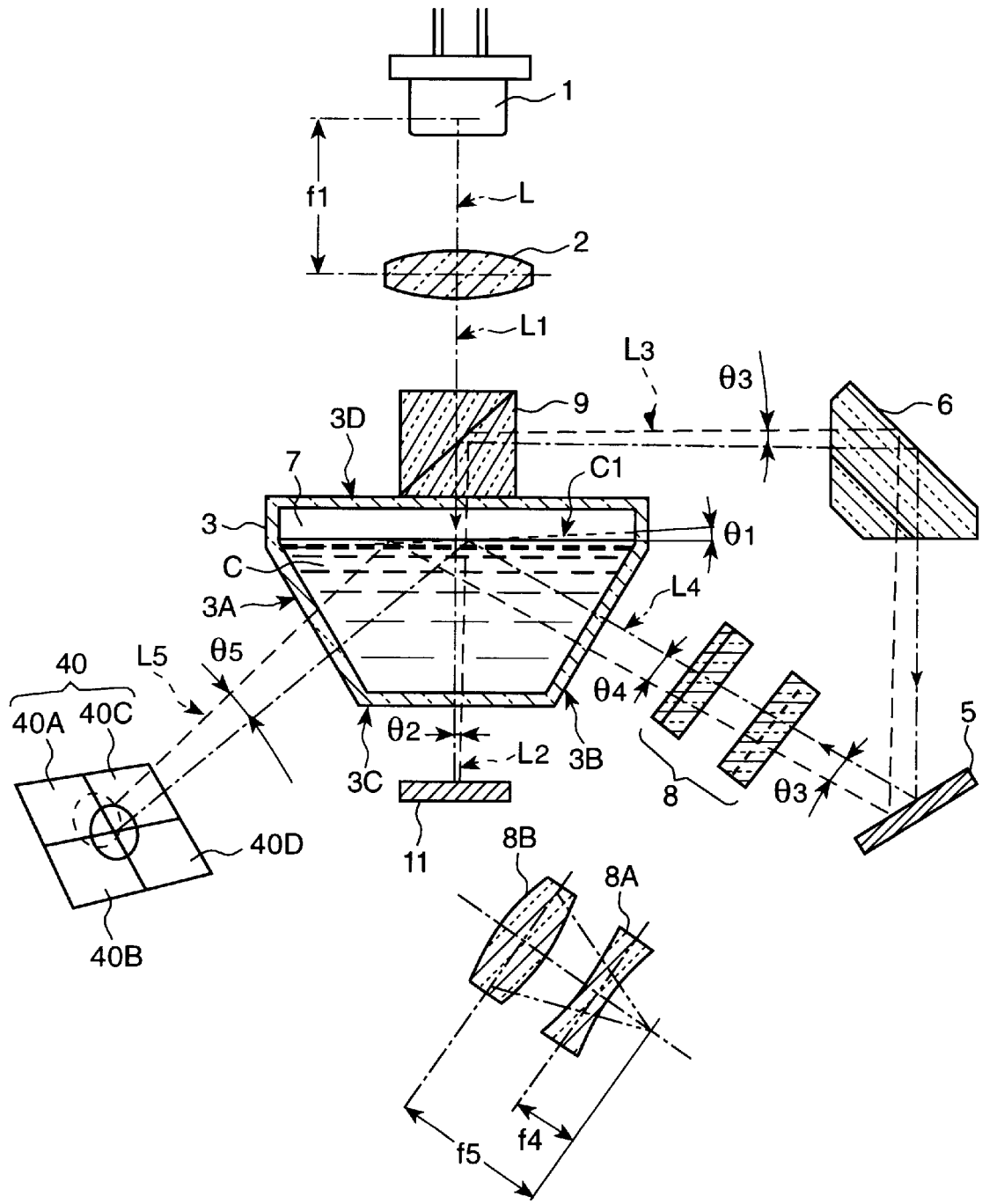
FIG. 12 shows the principle structure of the automatic inclination corrector according to the eighth embodiment.

FIG. 12 shows the inclination sensor according to the eighth embodiment. The inclination sensor is build in various optical instruments for actual use.

The inclination sensor of FIG. 12 comprises a laser diode 1, a collimation lens (light projection system) 2 for guiding the laser beam L from the laser diode 1 to the free liquid surface C1 with a right angle, a beam splitter 9 for dividing a light beam into two components, a transparent container 3 for storing silicon oil C having a free liquid surface C1, a beam expander 8 composed of cylindrical lens 8A, 8B, reflecting mirrors 5, 11, a roof prism 6, and a quadrant light-receiving element 40.

A laser diode 1 is arranged so that the laser beam L is emitted downward. A collimation lens 2 is positioned so that the focal point f1 of the collimation lens 2 coincides with the position of the light source (of laser diode 1). In this structure, the laser beam L1 having exited from the collimation lens 2 becomes parallel light, and enters the free liquid surface C1 at a substantially right angle.

Transparent container 3 is made of, for example, glass. The transparent container 3 is sealed up, and has a top wall 3D arranged perpendicular to the laser beam L1, a bottom wall 3C parallel to the top wall 3D, slanting side walls 3B and 3A with slopes of 60 and –60 degrees, respectively. Silicon oil C is stored in the transparent container 3 so that a space 7 is formed between the silicon oil surface and the top wall 3D of the sealed container 3. Beam splitter 9 is bonded to the top wall 3D. Reflecting mirror 11 is provided under the bottom wall 3C so that the reflecting surface is parallel to the bottom wall 3C.

A roof prism 6 is positioned in the horizontal direction from the beam splitter 9. The roof prism 6 inverts the light components of the two axis directions of the laser beam which passed twice through the transparent container 3, while reflecting the laser beam downward in the vertical direction toward the reflecting mirror 5.

A beam expander 8 is positioned in the light path of a laser beam reflected by reflecting mirror 5, and is used to change the refraction sensitivities of two orthogonal light components (in the X and Y-axis directions) of the laser beam having passed twice through the transparent container 3. The beam expander 8 is composed of cylindrical lenses 8A and 8B. Laser beam L4 having passed through the beam expander 8 enters the slanting side wall 3B of transparent container 3 with a right angle.

The beam expander 8 is designed to change the refraction angle of the Y-axis component to ½. The refraction angle of the X-axis component is not affected by the beam expander 8. The quadrant light-receiving element 40 is composed of light-receiving elements 40A–40D with the same area size.

Operation of the inclination sensor will be described. When the sensor is slanted by an angle θ1, the sensor slopes by θ1 relative to the free liquid surface C1 of silicon oil C sealed within transparent container 3 because the free liquid surface C1 tends to be maintained horizontal. In FIG. 12, to simplify the explanation and drawing, the inclination of θ1 is indicated by the broken line such that the free liquid surface C1 inclines relative to the transparent container 3 from the horizontal state indicated by the solid line to the position of the broken line.

Laser beam L emitted from the laser diode 1 is collimated by the collimation lens 2 and becomes a parallel light beam L1. The laser beam L1 enters the top wall 3D of the transparent container 3, passes through silicon oil C having the free liquid surface C1, and exits from the bottom wall 3C downward, as a laser beam L2. The laser beam L2 enters the roof prism 6. The angle of refraction of the laser beam L2 is expressed as follows:

$$\theta 2=(n-1)\theta 1$$

(n: the refractive index of silicon oil C)

The laser beam L2 advancing downward is reflected by the reflecting mirror 11, and enters the bottom wall 3C again. The laser beam L2 having passed through silicon oil C and exited from the free liquid surface C1 is reflected by the beam splitter 9 in the horizontal direction as a laser beam L3, and enters roof prism 6. The angle of refraction θ3 of laser beam L3 is expressed as follows:

$$\theta 3=2(n-1)\theta 1$$

Both the X and Y-axis components of the laser beam L3 are inverted by roof prism 6, and at the same time, the laser beam L3 is reflected downward in the vertical direction by reflecting mirror 5 and is guided to the beam expander 8.

The beam expander 8 is composed of a concave cylindrical lens 8A and a convex cylindrical lens 8B, both of which have a curvature only in the Y-axis direction. The lenses 51A and 51B have focal lengths f4 and f5, respectively, and their focal points coincide with each other. The relationship between the focal lengths is f4:f5=2:1. Therefore, the angular magnification of the Y-axis component becomes ½.

The angle of refraction of laser beam L3 in only the Y-axis component is made ½ by the beam expander 8. Therefore, the following equation is established.

$$\theta 4y = \theta 3 * \tfrac{1}{2} = 2(n-1)\theta 1 * \tfrac{1}{2} = (n-1)\theta 1$$

The X-axis component does not change, and the angle of refraction θ4x in the X-axis direction is expressed as follows:

$$\theta 4x = \theta 3 = 2(n-1)\theta 1$$

Thus, the laser beam L3 having passed twice through silicon oil C is modified by the beam the expander 8 with the refraction angles of X and Y-axis components changed, and enters the transparent container 3 again, as laser beam L4, through the slanting side wall 3B.

Laser beam L4 enters the free liquid surface C1 through the silicon oil C. The incident angle is changed by θ1 from the original incident angle of 60 degrees in the non-slanting state. Laser beam L4 enters the free liquid surface C1 with an angle of substantially 60 degrees (in FIG. 12, with an incident angle 60−θ1+θ4 degrees) and is totally reflected toward out of the container 3 through the slanting side wall 3A.

Among the totally reflected laser beam from the free liquid surface C1, the sensitivity of the total reflection angle θ5x in the X-axis direction is expressed as follows:

$$\begin{aligned}\theta 5x &= 2n\theta 1 - \theta 4x \\ &= 2n\theta 1 - 2(n-1)\theta 1 \\ &= 2\theta 1\end{aligned}$$

The sensitivity of the total reflection angle θ5y in the Y-axis direction is expressed as follows:

$$\begin{aligned}\theta 5y &= n\theta 1 - \theta 4y \\ &= n\theta 1 - (n-1)\theta 1 \\ &= \theta 1\end{aligned}$$

As a result, the laser beam L5 having exited from the transparent container 3 has a doubled reflection sensitivity in the X-axis direction. In this state, laser beam L4 strikes the quadrant light-receiving element 40. Based on the position shift of incident laser beam on the quadrant light-receiving element 40.light-receiving amounts at the light-receiving elements 40A–40D are calculated, thereby obtaining inclination angles in the X and Y-axis directions.

In this inclination sensor, the expressions of θ5x and θ5y do not contain the refractive index n of silicon oil C. A change of the refractive index due to a corresponding change in temperature does not affect the exit direction of the laser beam L5, and inclination detection is performed with high accuracy regardless of the temperature of the environment.

The laser beam which exits from the container after total reflection at the free liquid surface is inverted by an optical system. The inverted light beams passes through the transparent liquid and the free liquid surface. The angle of refraction of the light beam which exits to the external air layer after total reflection at the free liquid surface is canceled by the angle of refraction of the inverted laser beam, which passes through the transparent liquid and the free liquid surface. Even if the refractive index of the transparent liquid varies due to the temperature change, inclination correction is accurately made without being affected by a corresponding change in the refractive index.

The reflection sensitivities of light components in two orthogonal axis directions are made equal. This light beam is inverted by an optical system, and passes through transparent liquid and the free liquid surface. Therefore, the two axis components of a laser beam having exited from the corrector is always directed in a fixed direction.

The inverted light beam passes once through transparent liquid and the free liquid surface C1. This has a function of removing the influence of the refractive index of the transparent liquid, and of giving an angular change to the light beam so that the light beam emitted from the corrector always heads in a fixed direction. When the light beam from the light source enters free liquid surface with an incident angle of 60 degrees, accurate inclination correction is performed without being affected by a change in the refractive index due to a change in temperature. An optical system for giving an angular change to the exit light beam to guide the exit light in a fixed direction is not necessary. This further simplifies the structure and further reduces cost.

The inverted light beam passes twice through the transparent liquid and the free liquid surface. This has a function of removing the influence of the refractive index of the transparent liquid. Furthermore, an angular change is given to the light beam having exited from the container after penetrating the container twice, so that the light beam emitted from the inclination sensor always advances in the horizontal or vertical direction. When the light beam from the light source enters a free liquid surface with an incident angle of 45 degrees, accurate inclination correction is performed without being affected by a change in the refractive index due to a change in temperature.

The light component of the light beam which exists from the container after total reflection passes once through the transparent liquid and the free liquid surface, is received at the first light-receiving element. The light component which passes twice through the transparent liquid and the free liquid surface is received at the second light-receiving element. Two light components having different reflection sensitivities are separately received at the first and second light-receiving elements. This eliminates the necessity of an optical system for making the reflection sensitivities of the two axis light components equal to each other. Thus, the structure is further simplified and cost is further reduced.

What is claimed is:

1. An automatic inclination corrector for correcting an inclination of an instrument so that a light beam emitted from said automatic inclination corrector always heads in a fixed direction, said automatic inclination corrector comprising:

a light source to emit said light beam;

a container to store a transparent liquid having a free liquid surface;

a light projection system to guide said light beam to said free liquid surface at an angle that allows said light beam to be reflected totally at said free liquid surface; and an optical system to invert said totally reflected light beam exiting from said container, and to secondly reflect said totally reflected light beam to pass back through said transparent liquid and through said free liquid surface.

2. The automatic inclination corrector according to claim 1, further comprising:

a reflection sensitivity corrector to equate a first direction light component of said totally reflected light beam to a second direction light component orthogonal to said first direction light component of said totally reflected light beam.

3. The automatic inclination corrector according to claim 1 or 2, wherein:

an incident angle of said light beam from said light source against said container is 60 degrees; and said optical system secondly reflects said totally reflected light beam to pass only once back through said transparent liquid and said free liquid surface.

4. The automatic inclination corrector according to claim 1 or 2, wherein:
said optical system secondly reflects said totally reflected light beam to pass twice through said transparent liquid and said free liquid surface; and
said automatic inclination corrector further comprises an angle changer for changing an angle of said secondly reflected light beam having passed twice back through said liquid so that said light beam exiting from said container advances in one of a vertical direction and a horizontal direction.

5. The automatic inclination corrector according to claim 1 or 2, further comprising:
a light receiver to receive said secondly reflected light beam having passed back through said liquid and said free liquid surface and exiting from said container.

6. The automatic inclination corrector according to claim 5, wherein:
an incident angle of said light beam from said light source against said container is 60 degrees;
said optical system secondly reflects said totally reflected light beam having exited from said container so that said inverted light beam passes twice through said liquid and said free liquid surface; and
said light receiver comprises:
a first light-receiving unit to receive said secondly reflected light beam having passed once through said liquid and said free liquid surface, and
a second light-receiving unit to receive said secondly reflected light beam having passed twice through said liquid and said free liquid surface.

7. An automatic inclination corrector for correcting an inclination of an instrument so that a light beam emitted from said automatic inclination corrector always heads in a fixed direction, said automatic inclination corrector comprising:
a light source to emit said light beam;
a container to store a transparent liquid having a free liquid surface;
a light projection system to guide said light beam through said transparent liquid and through said free liquid surface; and
an optical system for inverting said light beam having passed through said transparent liquid, through said free liquid surface, and exited from said container, while reflecting the light beam so that the inverted light beam is totally reflected by the free liquid surface.

8. The automatic inclination corrector according to claim 7, further comprising:
a penetration sensitivity adjuster to adjust a penetration sensitivity of both a first direction light component and a second direction light component orthogonal to said first direction, of said light beam having passed through said free liquid surface.

9. The automatic inclination corrector according to claim 7 or 8, further comprising:
a reflector to reflect said light beam emitted from said light source through said liquid and said free liquid surface twice.

10. The automatic inclination corrector according to claim 7 or 8, further comprising:
a reflection sensitivity corrector to equate a first direction light component of said totally reflected light beam to a second direction light component orthogonal to said first direction light component of said totally reflected light beam.

11. An automatic inclination corrector sensor according to claim 7 or 8, further comprising:
a light receiver to receive said totally reflected light beam.

12. An automatic inclination corrector for correcting inclination of an instrument so that a light beam emitted from said automatic inclination corrector always heads in a fixed direction, said automatic inclination corrector comprising:
a light source to emit said light beam;
a container to store a transparent liquid having a free liquid surface;
light projection means for guiding said light beam to said free liquid surface at an angle that allows said light beam to be reflected totally at said free liquid surface; and
inversion and reflection means for inverting said totally reflected light beam exiting from said container, and for secondly reflecting said totally reflected light beam to pass back through said transparent liquid and through said free liquid surface.

13. The automatic inclination corrector according to claim 1, 7 or 12, wherein:
an incident angle of said light beam from said light source against said free liquid surface is substantially 60 degrees.

14. An inclination corrector comprising:
a transparent container comprising:
a planar bottom surface and two planar side surfaces, said two planar side surfaces each forming an included angle with said planar bottom surface of greater than 90 degrees,
a top, and
a liquid,
said two planar side surfaces being non-coplanar to one another, and
said top being separated from a free liquid surface of said liquid;
a light source to emit a light beam through a first one of said two planar side surfaces of said container and to said free liquid surface of said liquid such that said light beam is reflected totally at said free liquid surface and exits said container through a second one of said two planar side surfaces of said container;
an inverter and reflector to invert said totally reflected light beam exiting from said container and to redirect said inverted totally reflected light beam toward said planar bottom surface of said container such that said inverted totally reflected light beam passes through said liquid and through said free liquid surface;
whereby a temperature dependence of an accuracy of said inclination corrector is eliminated.

15. The inclination corrector according to claim 14, wherein:
an incident angle of said light beam from said light source against said free liquid surface is substantially 60 degrees.

16. The automatic inclination corrector according to claim 9, further comprising:
a reflection sensitivity corrector to equate a first direction light component of said totally reflected light beam to a second direction light component of said totally reflected light beam.

17. An automatic inclination corrector sensor according to claim 9, further comprising:
a light receiver to receive said totally reflected light beam.

* * * * *